United States Patent
Wada et al.

(10) Patent No.: US 11,247,121 B2
(45) Date of Patent: Feb. 15, 2022

(54) COMPUTER-READABLE NON-TRANSITORY STORAGE MEDIUM HAVING GAME PROGRAM STORED THEREIN, GAME SYSTEM, GAME APPARATUS, AND GAME PROCESSING CONTROL METHOD FOR CORRECT DIRECTION DETERMINATION

(71) Applicant: NINTENDO CO., LTD., Kyoto (JP)

(72) Inventors: Masaki Wada, Kyoto (JP); Shinya Yano, Kyoto (JP); Hiroki Hamaue, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 113 days.

(21) Appl. No.: 16/733,894

(22) Filed: Jan. 3, 2020

(65) Prior Publication Data

US 2021/0038973 A1    Feb. 11, 2021

(30) Foreign Application Priority Data

Aug. 7, 2019  (JP) .............................. JP2019-145552

(51) Int. Cl.
*A63F 13/24* (2014.01)
*A63F 13/211* (2014.01)
*G06F 3/0346* (2013.01)

(52) U.S. Cl.
CPC .......... *A63F 13/211* (2014.09); *G06F 3/0346* (2013.01)

(58) Field of Classification Search
CPC ............................. A63F 13/211; G06F 3/0346
See application file for complete search history.

(56) References Cited

U.S. PATENT DOCUMENTS

| 2008/0242417 | A1* | 10/2008 | Schueller | A63F 13/12 463/41 |
| 2009/0069096 | A1* | 3/2009 | Nishimoto | A63F 13/814 463/43 |
| 2009/0226870 | A1* | 9/2009 | Minotti | G09B 7/00 434/322 |
| 2010/0151948 | A1* | 6/2010 | Vance | A63F 13/10 463/43 |

(Continued)

FOREIGN PATENT DOCUMENTS

| JP | 2009-082696 A | 4/2009 |
| JP | 2010-233742 A | 10/2010 |
| JP | 2016-002165 A | 1/2016 |

*Primary Examiner* — Omkar A Deodhar
*Assistant Examiner* — Shauna-Kay Hall
(74) *Attorney, Agent, or Firm* — Scully, Scott, Murphy & Presser, P.C.

(57) ABSTRACT

In the exemplary embodiment, a computer is caused to: perform question presentation processing of designating a correct direction for each question by display; specify an input direction on the basis of the operation data transmitted from an operation device; perform correct answer determination for whether the input direction is the designated correct direction or a direction other than the designated correct direction on the basis of a predetermined determination condition; in performing the correct answer determination, change the determination condition in accordance with the correct direction so that the specified input direction becomes likely to be determined to be the correct answer; and progress a game on the basis of a result of the correct answer determination.

22 Claims, 32 Drawing Sheets

(56) References Cited

U.S. PATENT DOCUMENTS

| | | | |
|---|---|---|---|
| 2012/0088222 A1* | 4/2012 | Considine | G09B 7/02 |
| | | | 434/362 |
| 2012/0141969 A1* | 6/2012 | Ohmae | G06Q 30/02 |
| | | | 434/362 |
| 2012/0165099 A1* | 6/2012 | Ito | A63F 13/2145 |
| | | | 463/37 |
| 2014/0141969 A1* | 5/2014 | Magela De Lima | B01J 20/261 |
| | | | 502/402 |
| 2017/0136349 A1 | 5/2017 | Tsuchiya et al. | |
| 2017/0348592 A1* | 12/2017 | Tanaka | A63F 13/211 |

* cited by examiner

F I G. 7
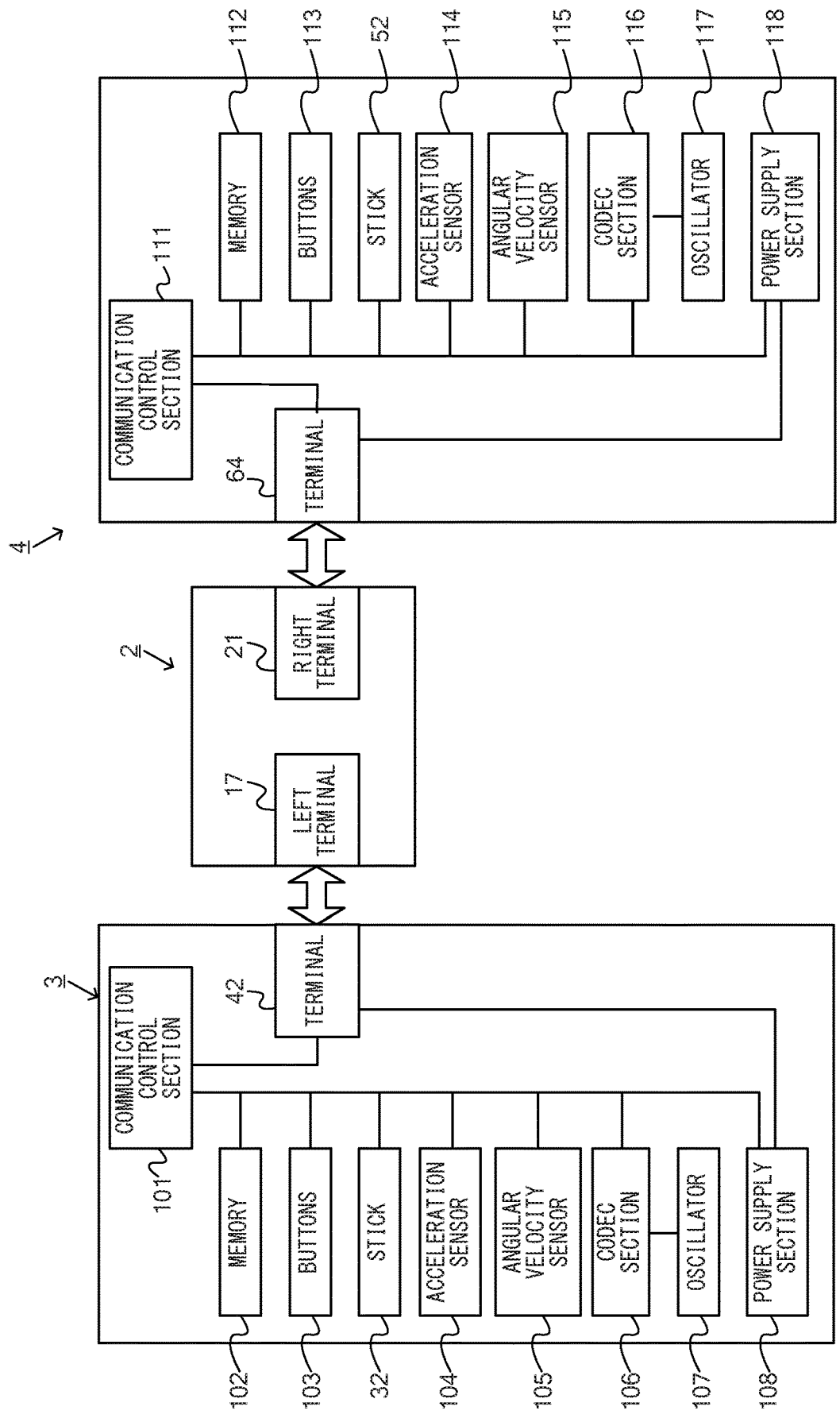

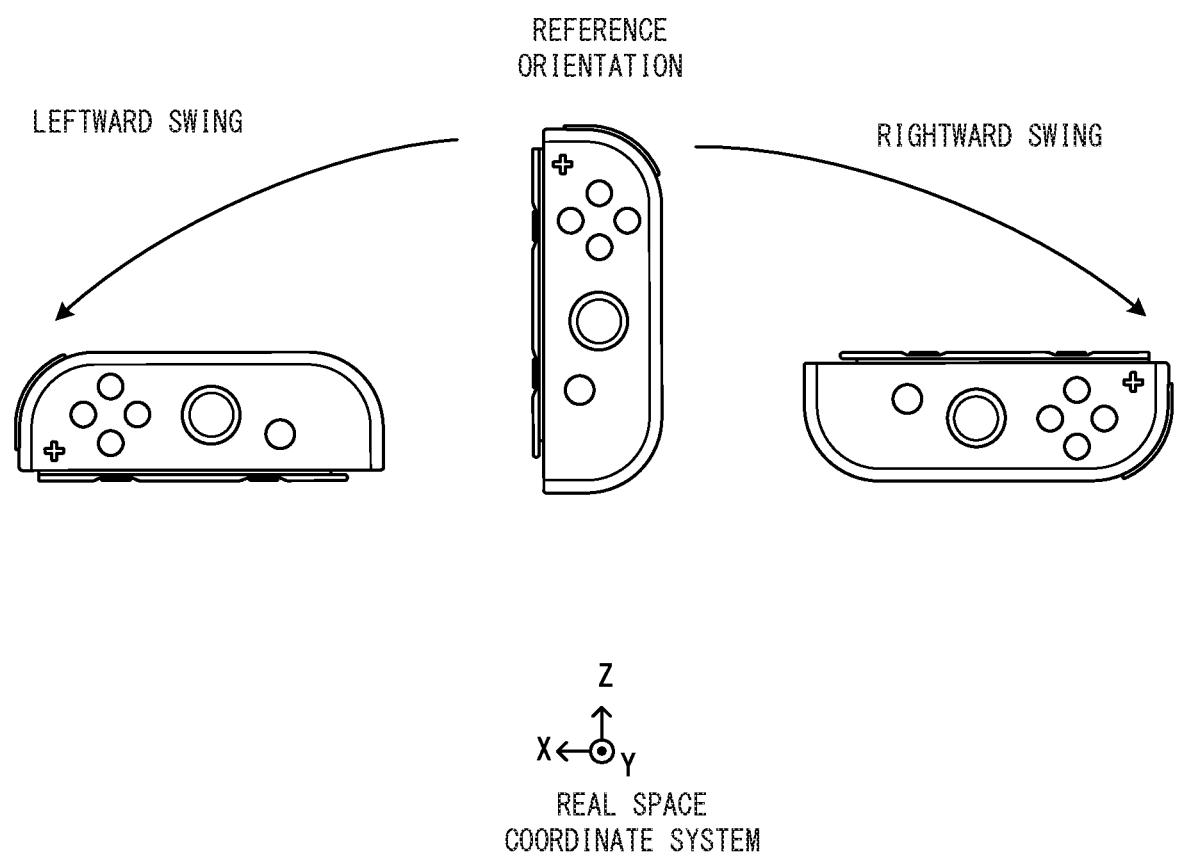
F I G. 10

F I G. 2 5
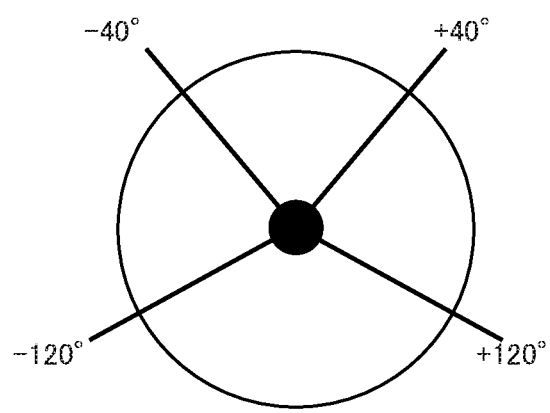

FIG. 34

| QUESTION PRESENTATION ORDER | CORRECT DIRECTION INFORMATION |
|---|---|
| O1 | UP |
| O2 | RIGHT |
| O3 | DOWN |
| ⋮ | ⋮ |

COMPUTER-READABLE NON-TRANSITORY STORAGE MEDIUM HAVING GAME PROGRAM STORED THEREIN, GAME SYSTEM, GAME APPARATUS, AND GAME PROCESSING CONTROL METHOD FOR CORRECT DIRECTION DETERMINATION

CROSS REFERENCE TO RELATED APPLICATION

The disclosure of Japanese Patent Application No. 2019-145552, filed on Aug. 7, 2019, is incorporated herein by reference.

FIELD

The exemplary embodiments relate to game processing that causes a player to perform a direction input to a correct direction that is a correct answer for each of a plurality of questions.

BACKGROUND AND SUMMARY

Conventionally, there is known a game in which an image indicating a movement manner for a controller is displayed and a player moves the controller in a real space while seeing the image. In such a game, through determination as to the orientation of the controller, the degree of matching between the movement direction of the controller and the indicated movement manner is determined.

The game as described above has a problem that, while the controller is being moved, if the controller is (temporarily) moved in a direction different from the indicated movement manner, it is likely to be determined that the input has failed.

Therefore, an object of the exemplary embodiments is to provide a computer-readable non-transitory storage medium having a game program stored therein, a game system, a game apparatus, and a game processing control method that enable decrease in occurrences of erroneous determination as to direction input in a game that progresses in accordance with whether a direction input is correct or incorrect with respect to an indicated direction.

Configuration examples for achieving the above object will be shown below.

One configuration example is a computer-readable non-transitory storage medium having stored therein a game program for causing a computer of an information processing apparatus to execute a game process that causes a player to perform a direction input in a correct direction that is a correct answer for each of a plurality of questions. The game program causes the computer to execute the following processing: performing question presentation processing of designating the correct direction for each question by display; acquiring operation data transmitted from an operation device; specifying an input direction on the basis of the operation data; performing correct answer determination for whether the input direction is the designated correct direction or a direction other than the designated correct direction on the basis of a predetermined determination condition; in performing the correct answer determination, changing the determination condition in accordance with the correct direction so that the specified input direction becomes likely to be determined to be the correct answer; and progressing a game on the basis of a result of the correct answer determination.

According to the above configuration example, the determination condition for determining a direction inputted by the player is changed in accordance with the correct direction so that the input direction is determined to be correct. Thus, it is possible to determine the input direction with the determination condition adjusted so as to facilitate correct answering. Therefore, in a game in which correct directions are presented to a player in advance and the player is caused to input directions, occurrences of erroneous determination can be decreased. For example, in the case where any one of four directions, i.e., up, down, left, right, is a correct direction, erroneous determination when an ambiguous direction input such as an obliquely rightward and upward direction can be suppressed.

In another configuration example, the operation device may include an inertial sensor. The operation data may include data based on a detection result from the inertial sensor. The game program may further cause the computer to: calculate an orientation or a movement direction of the operation device on the basis of the operation data; and specify the input direction on the basis of the orientation or the movement direction of the operation device.

According to the above configuration example, in a game in which the operation device itself is moved to perform a direction input, occurrences of erroneous determination are decreased, whereby amusement of the game can be increased.

In another configuration example, the game program may cause the computer to: calculate a vector indicating a predetermined axis of the operation device, as the orientation; set a determination area for a value of the vector; perform the correct answer determination using, as the determination condition, whether or not the vector is included in a determination area corresponding to the correct answer; and in performing the correct answer determination, change the determination condition so that the input direction becomes likely to be determined to be the correct answer, by enlarging the determination area corresponding to the correct answer, for each question.

According to the above configuration example, the correct answer determination is performed using the vector indicating the predetermined axis of the operation device and the determination area corresponding to the correct answer. At this time, it is possible to perform the correct answer determination after changing the size of the determination area in accordance with the correct direction.

In another configuration example, the vector may be a projection vector obtained by projecting a three-dimensional vector indicating the predetermined axis of the operation device, on a two-dimensional plane such that a vector corresponding to a reference orientation is set as an origin. The determination area may be composed of areas divided in upward, downward, leftward, and rightward directions by lines passing through the origin with respect to the two-dimensional projection vector, the areas respectively including non-determination areas which are within a predetermined distance from the origin and in which an input is determined to be none of direction inputs, and direction determination areas located outside the non-determination areas and divided in the upward, downward, leftward, and rightward directions, the direction determination areas being for determining a direction input in each of the upward, downward, leftward, and rightward directions, and in the correct answer determination, a central angle of the direction determination area corresponding to the correct answer may be set to be great.

According to the above configuration example, in the case where the magnitude of input is within the non-determination area, the input is not treated as a valid direction input. That is, it is possible to require the player to tilt the operation device definitely to a certain extent, whereby an input having a halfway magnitude can be prevented from resulting in erroneous determination. In addition, since the determination is performed with the direction determination area enlarged in accordance with the correct direction, erroneous determination when an ambiguous direction input is performed can be suppressed.

In another configuration example, the non-determination areas may be set such that a distance from the origin for the downward area or the upward and downward areas is shorter than a distance from the origin for the leftward and rightward areas.

According to the above configuration example, for example, in the case of changing the orientation of the operation device upward, downward, leftward, or rightward using a wrist as a fulcrum, an input in the upward/downward direction, in which it is difficult to perform a direction input as compared to the leftward/rightward direction and change in the orientation tends to be small, can become more likely to be determined to be a correct input.

In another configuration example, the operation data may include data indicating the magnitude of input. The game program may cause the computer to: when the magnitude of input is greater than a predetermined threshold, perform another determination processing of determining the input direction, before performing the correct answer determination; and as a result of the other determination processing, if the input direction is the designated correct direction, progress the game in a manner corresponding to a case where the input direction is the correct answer, without performing the correct answer determination.

According to the above configuration example, in the case where the magnitude of input is great to a certain extent, correct direction input determination is performed using another determination processing first. Thus, correct answer determination can be performed in stages, whereby the determination process can be performed more swiftly and overall determination accuracy can be enhanced.

In another configuration example, the game program may cause the computer to, in the correct answer determination, make the determination definite when a state in which the input direction is determined to be any direction has continued for a predetermined time period, and change the determination condition such that, in a case where the input direction is determined to be the correct direction, the determination that the input direction is the correct direction becomes definite within a shorter continuation time period than in a case where the input direction is determined to be a direction other than the correct direction, so that the input direction becomes likely to be determined to be the correct answer.

According to the above configuration example, a state of indicating a predetermined direction is required to be kept during a predetermined time period, in order that the input becomes definite as a correct or incorrect answer. In addition, the time period required for the input to become definite is set to be shorter for a correct answer than for an incorrect answer. Thus, in the case where the operation device is moved so as to continuously perform direction inputs, it is possible to prevent erroneous determination from occurring when an input operation is performed so as to pass across an incorrect direction on the movement trajectory (in the middle of the input operation).

According to the exemplary embodiments, in a game in which correct directions are presented to a player and the player is caused to perform direction inputs, it is possible to decrease events in which the direction inputs are erroneously determined to be incorrect directions.

BRIEF DESCRIPTION OF THE DRAWINGS

FIG. 7 is a block diagram showing a non-limiting example of the internal configurations of the main body apparatus 2, the left controller 3, and the right controller 4;

FIG. 10 shows a non-limiting example of the reference orientation and change in the orientation of the right controller 4 to the left/right direction;

FIG. 25 shows a non-limiting example of the second threshold in the case where the correct direction is the downward direction;

FIG. 34 shows a non-limiting example of the data structure of stage information 406;

DETAILED DESCRIPTION OF NON-LIMITING EXAMPLE EMBODIMENTS

Hereinafter, the exemplary embodiments will be described. First, a game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
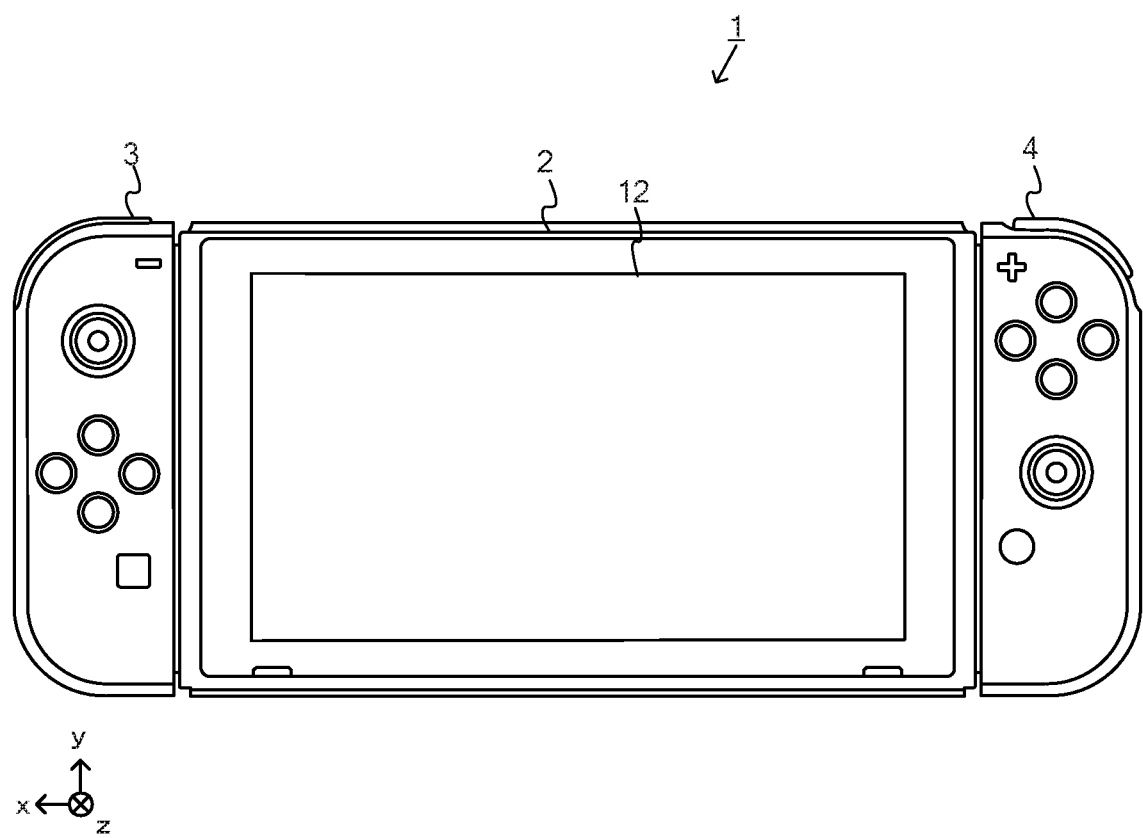
FIG. 1 shows a non-limiting example in which a left controller 3 and a right controller 4 are attached to a main body apparatus 2.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
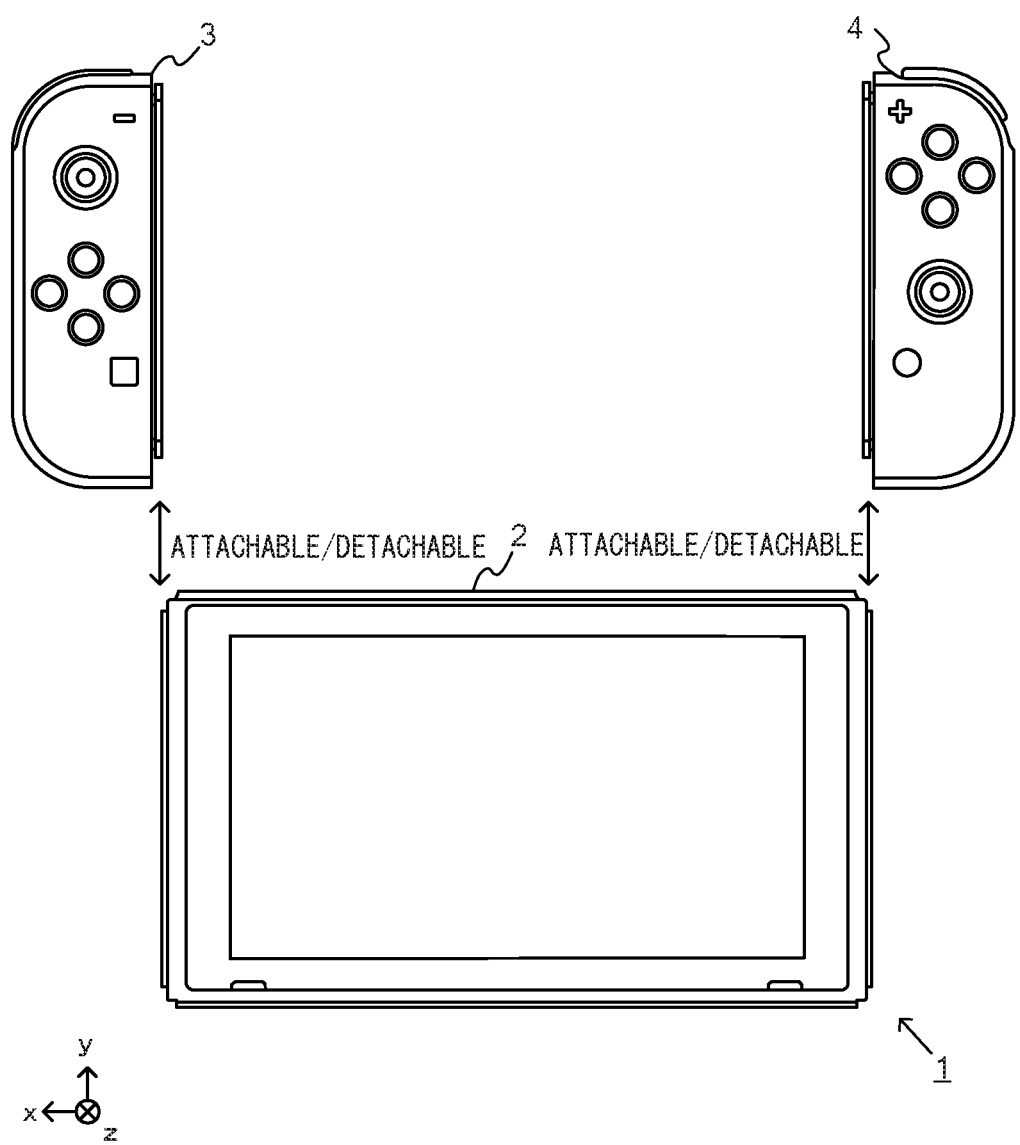
FIG. 2 shows a non-limiting example in which the left controller 3 and the right controller 4 are detached from the main body apparatus 2.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
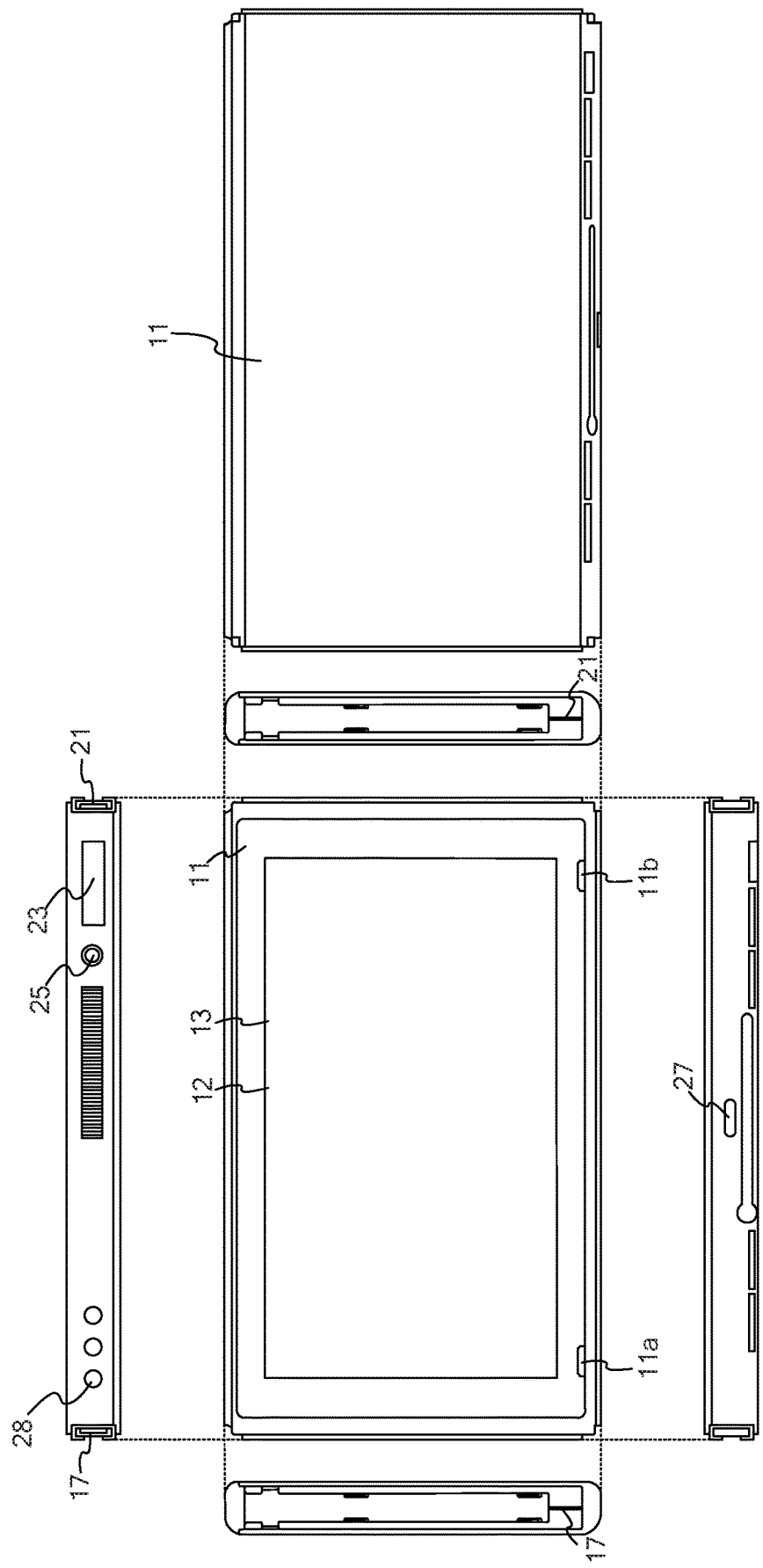
FIG. 3 is six orthogonal views showing a non-limiting example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
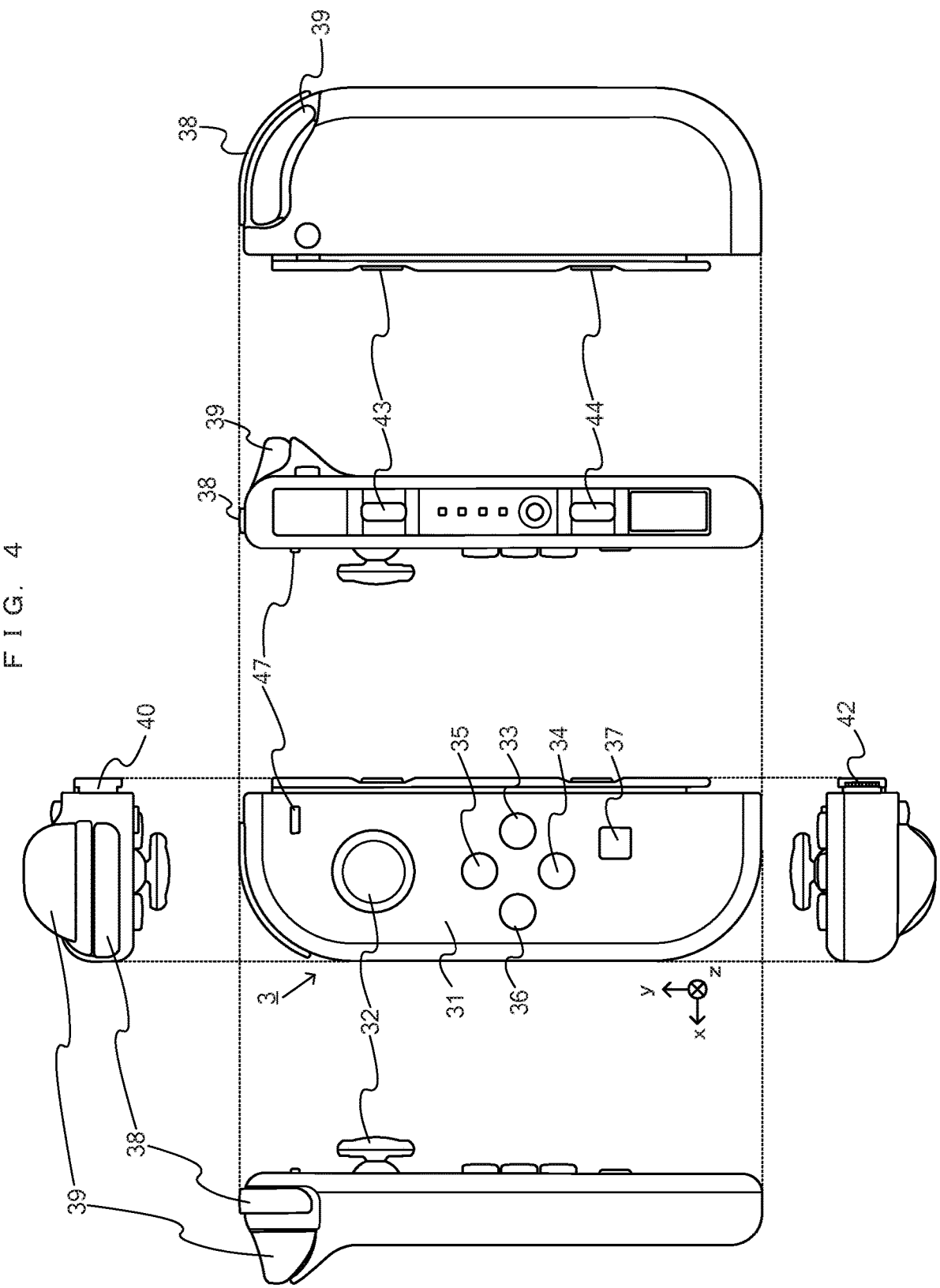
FIG. 4 is six orthogonal views showing a non-limiting example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
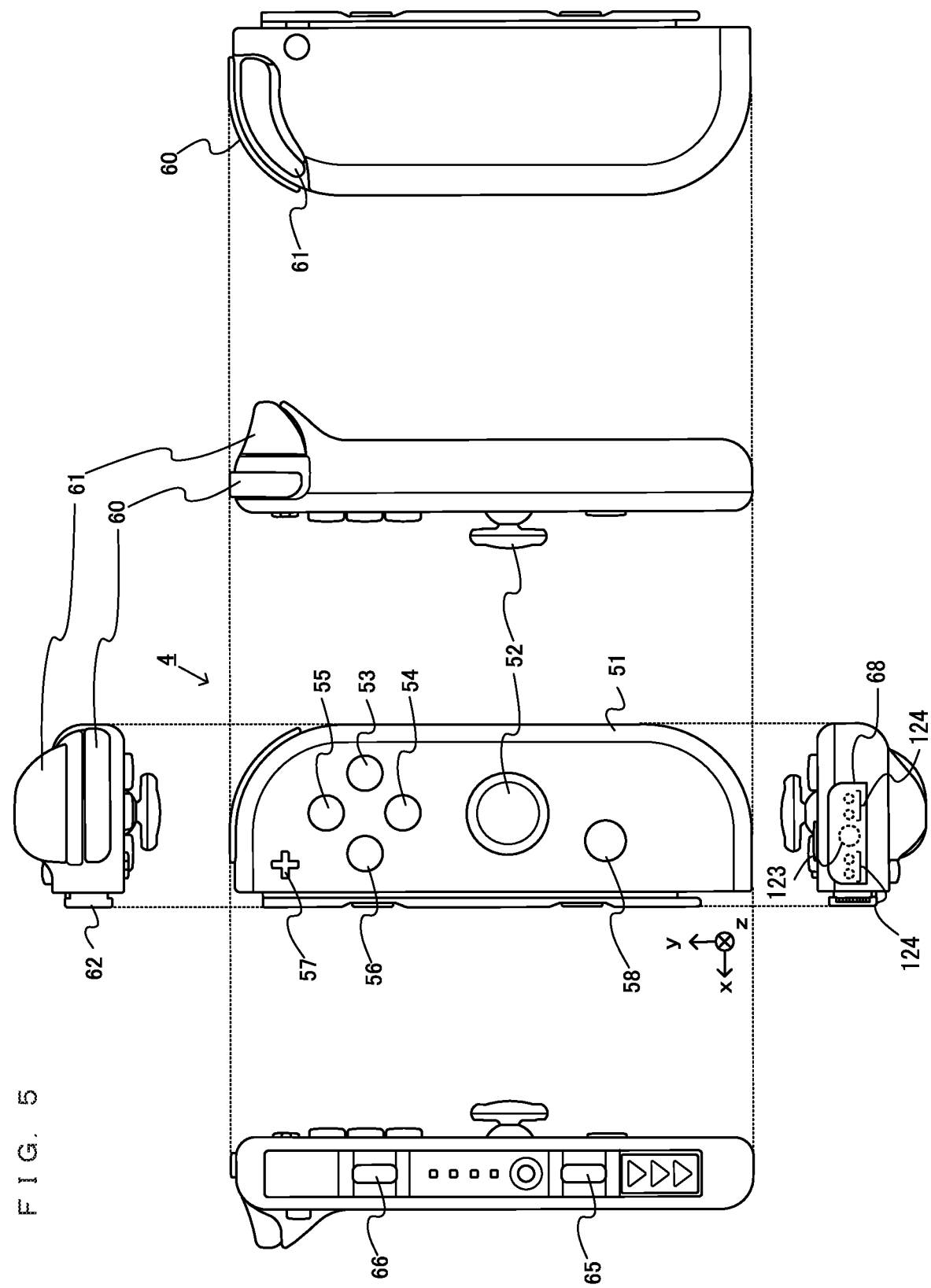
FIG. 5 is six orthogonal views showing a non-limiting example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
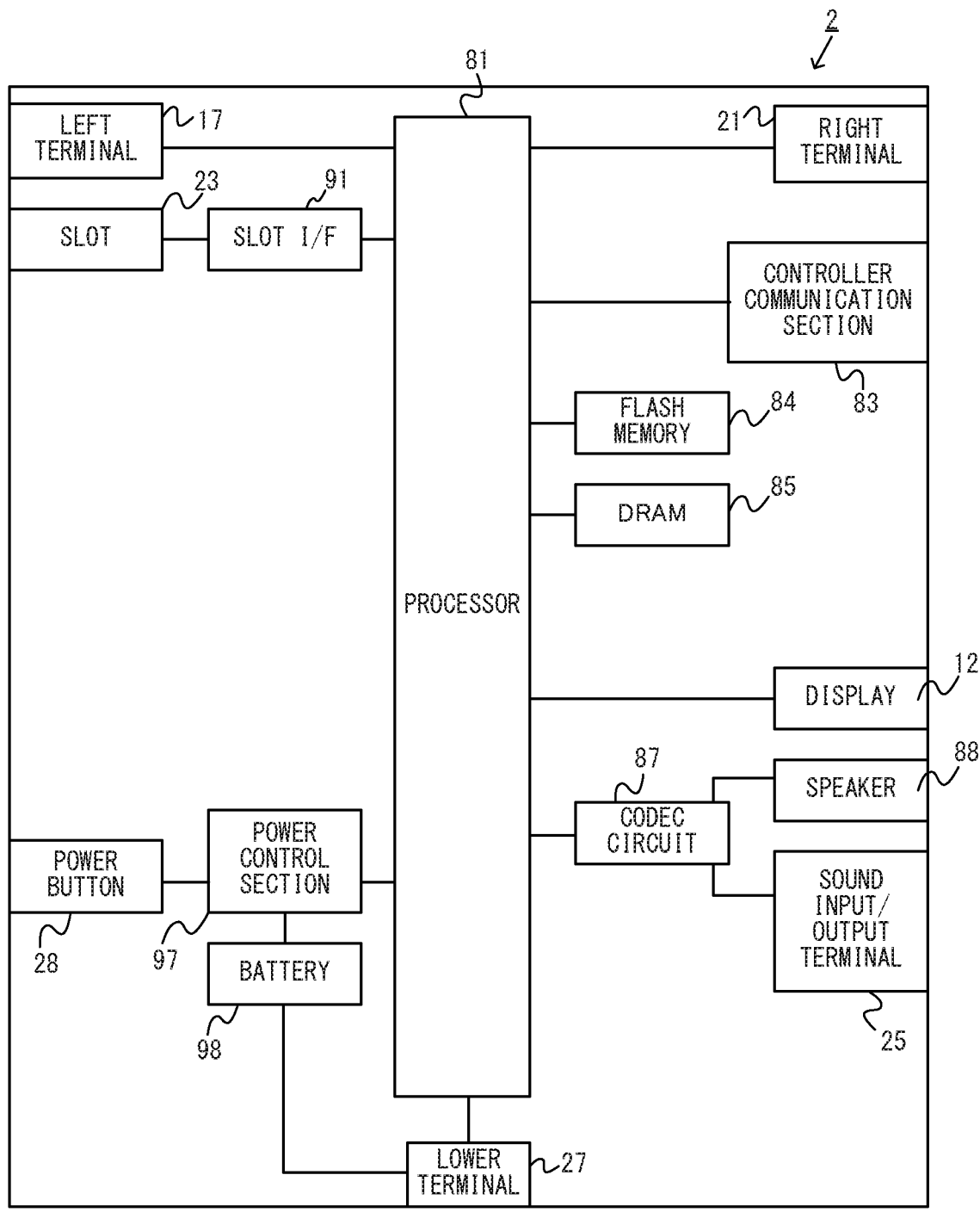
FIG. 6 is a block diagram showing a non-limiting example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

In the exemplary embodiment, it is assumed that the game is played in a state in which the main body apparatus 2 alone is mounted on the cradle with the left controller 3 and the right controller 4 detached from the main body apparatus 2, and an image generated and outputted by the main body apparatus 2 is displayed on a stationary monitor, as an example.

Next, the outline of the game process assumed in the exemplary embodiment will be described. In the exemplary embodiment, a game in which correct directions are presented in advance and a player is caused to perform direction inputs in the correct directions, is assumed. Specifically, a plurality of questions are prepared, and in each question, one of four directions, i.e., up, down, left, and right is defined as a direction that is a "correct answer" (hereinafter, correct direction). Then, correct directions in the respective questions are indicated as "question presentation" to a player in advance. Thereafter, the player is caused to perform direction inputs using the controller, and whether or not each input direction is the correct direction is determined, while the game progresses. In particular, in this game, correct directions for a plurality of questions are indicated to a player in a certain order at the time of question presentation, and the player is caused to input the correct directions in this order. In other words, the game tests the player's memory. More specifically, the game assumed in the exemplary embodiment is a flag swing game. In this game, the directions in which a flag is to be swung are indicated (question-presented) to a player in advance, and the player performs direction inputs using the controller to cause a player object to swing the flag.

Figure 8:
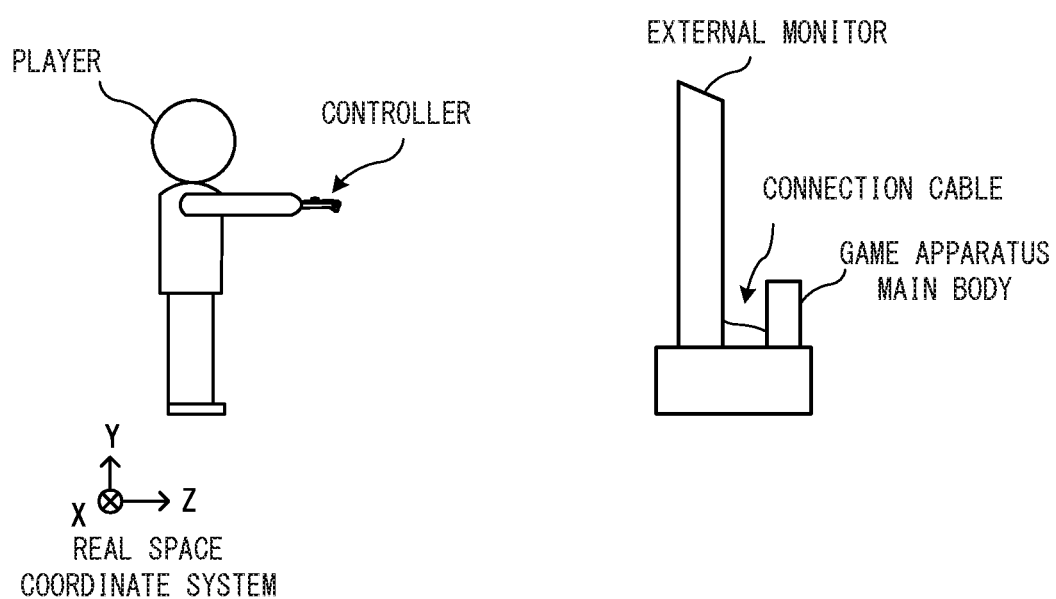
FIG. 8 shows a non-limiting example of a player and the orientation of a controller when the present game is played.

Next, operations in the game assumed in the exemplary embodiment will be described. In this game, direction inputs are performed using the inertial sensors. That is, a player swings the controller in the up/down/left/right direction, to perform a direction input in each direction. FIG. 8 shows an example of the player and the orientation of the controller when this game is played. In the example shown in FIG. 8, the player plays the game with the right hand holding the right controller 4 in the orientation in which the right controller 4 is vertically long. In the direction input operation, the orientation in which the y-axis direction of the right controller 4 is horizontal to the ground (the orientation in which the y-axis direction of the right controller 4 is perpendicular to the gravity direction, or the orientation in which the y-axis direction of the right controller 4 is parallel to the z axis of the real space coordinate system in FIG. 8) is defined as "reference orientation". Then, the player performs an action of swinging the right controller 4 in the up/down/left/right direction on the basis of the "reference orientation". A motion of the right controller 4 along with the action is detected and a swing in the up/down/left/right direction is treated as a direction input to each direction.

Figure 9:
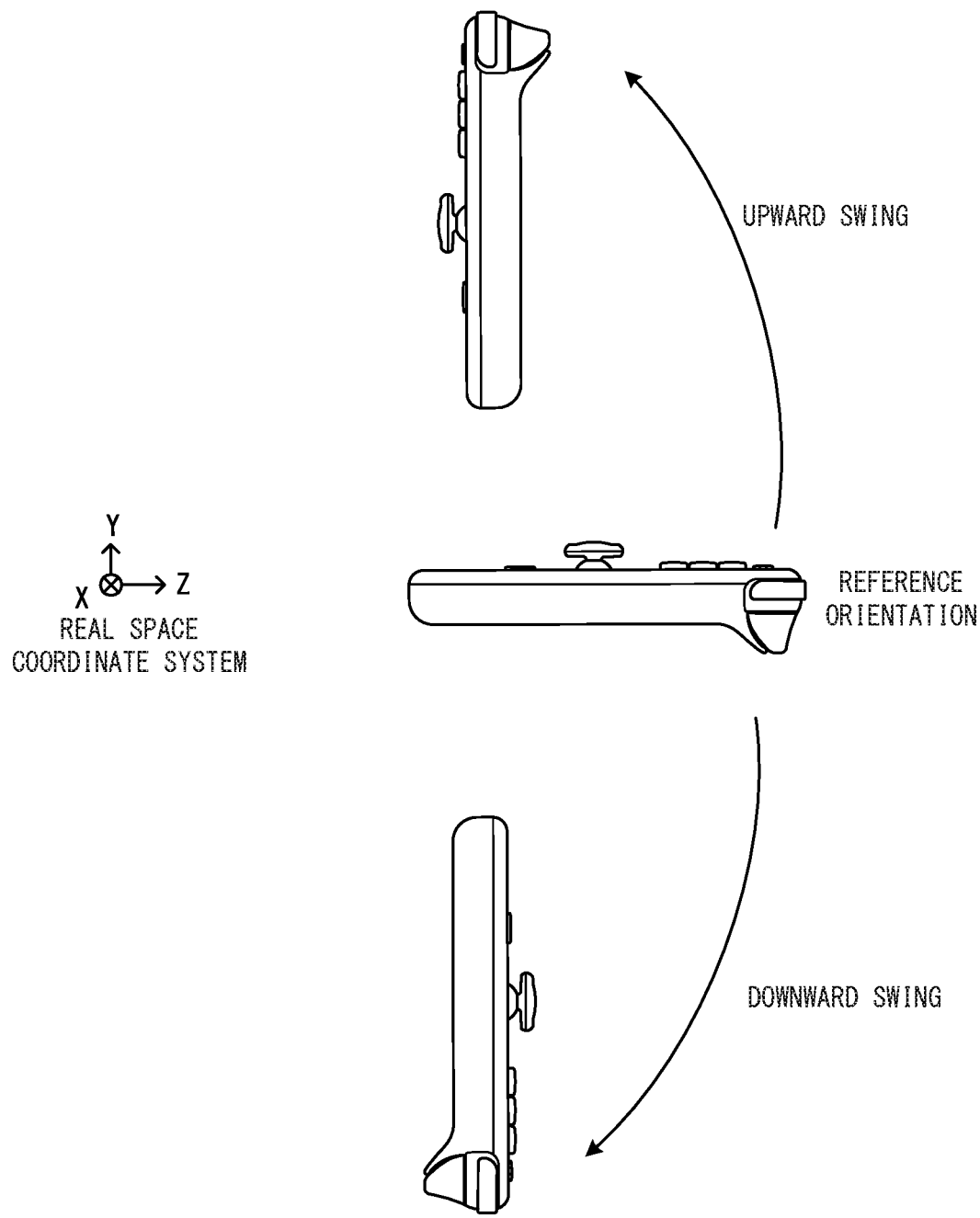
FIG. 9 shows a non-limiting example of a reference orientation and change in the orientation of the right controller 4 to the up/down direction.

For reference, FIG. 9 and FIG. 10 show the reference orientation and examples of changes in the orientation of the right controller 4 to the up/down/left/right directions. FIG. 9 is a schematic view showing an example of change in the orientation of the right controller 4 along with a swing in the up-down direction. As shown in FIG. 9, an operation of turning the orientation about the x-axis direction of the right controller 4 as a turning axis so that the head of the right controller 4 faces upward (positive direction of the y axis in the real space coordinate system) is treated as an input to "upward direction" (hereinafter, upward swing). On the other hand, an operation of turning the orientation so that the head of the right controller 4 faces downward (negative direction of the y axis in the real space coordinate system) is treated as an input to "downward direction" (hereinafter, downward swing). Next, FIG. 10 is a schematic view showing an example of change in the orientation of the right controller 4 along with a swing in the left-right direction. As shown in FIG. 10, an operation of turning the orientation about the z-axis direction of the right controller 4 as a turning axis so that the head of the right controller 4 faces leftward (positive direction of the x axis in the real space coordinate system) is treated as an input to "leftward direction" (hereinafter, leftward swing). On the other hand, an operation of turning the orientation so that the head of the right controller 4 faces rightward (negative direction of the x axis in the real space coordinate system) is treated as an input to "rightward direction" (hereinafter, rightward swing).

In this example, the case of using the right controller 4 is shown. However, the same processing is applicable even in the case of using the left controller 3.

Figure 11:
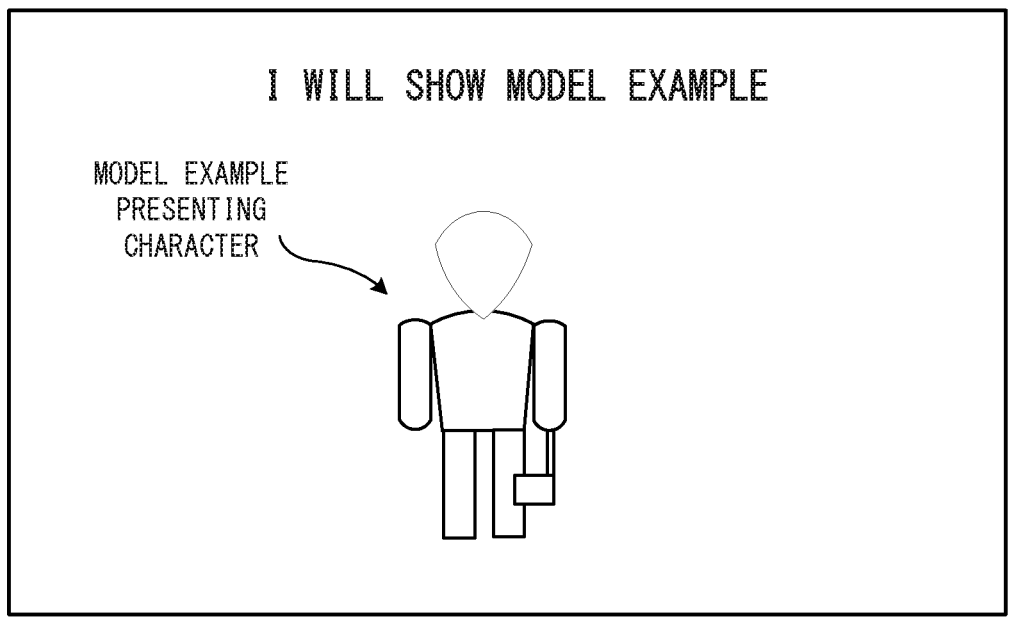
FIG. 11 shows a non-limiting example of a game screen.
Figure 12:
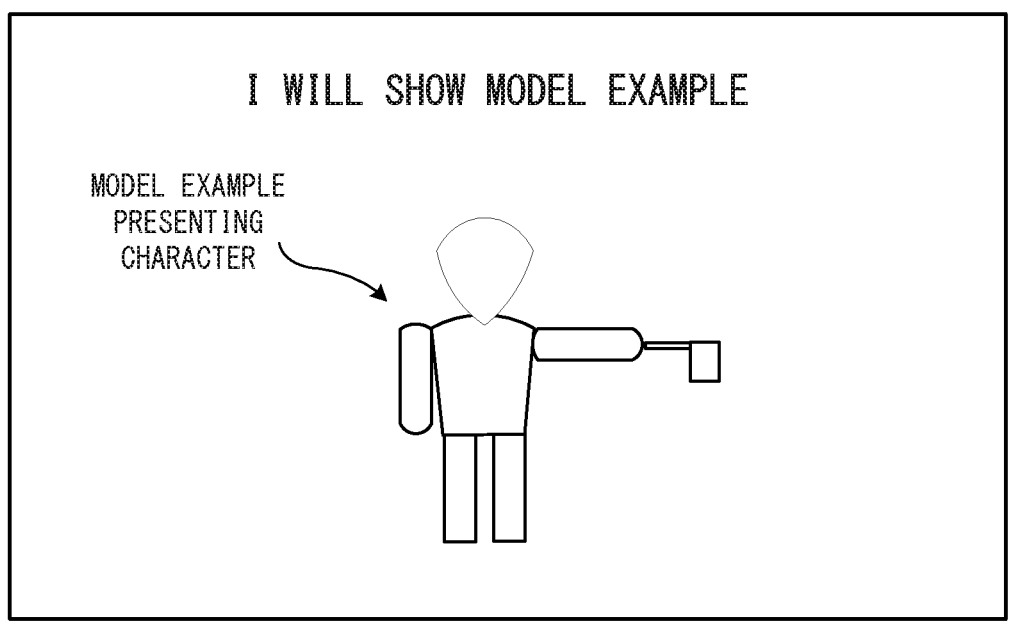
FIG. 12 shows a non-limiting example of a game screen.

Next, flow of the game will be described with reference to screen examples. Here, the number of questions is four, as an example. The correct directions are up, right, left, and then down, in the order from the first question. When the game is started, a "model example" indicating the order in which the flag is to be swung is presented to the player (in other words, questions are presented). FIG. 11 and FIG. 12 show examples of screens for presenting the model example.

In FIG. 11, a model example presenting character holding a flag is displayed, and a message for presenting the model example is also displayed. FIG. 12 shows the model example presenting character actually swinging the flag. Here, a motion (animation) of the model example presenting character swinging the flag in the order of up, right, left, down is to be displayed (meanwhile, the player needs to memorize the order in which the flag is to be swung).

Figure 13:
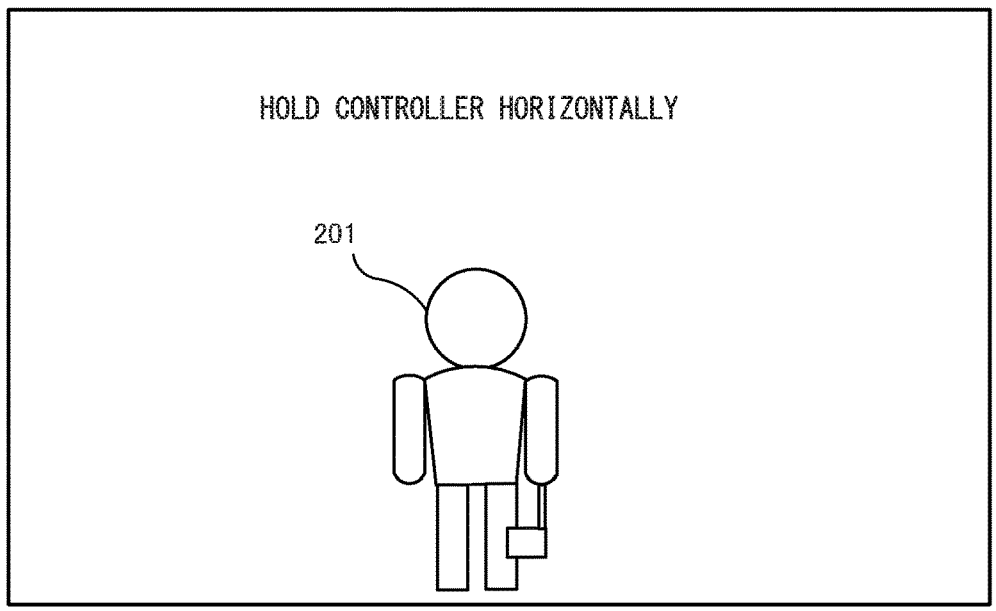
FIG. 13 shows a non-limiting example of a game screen.
Figure 14:
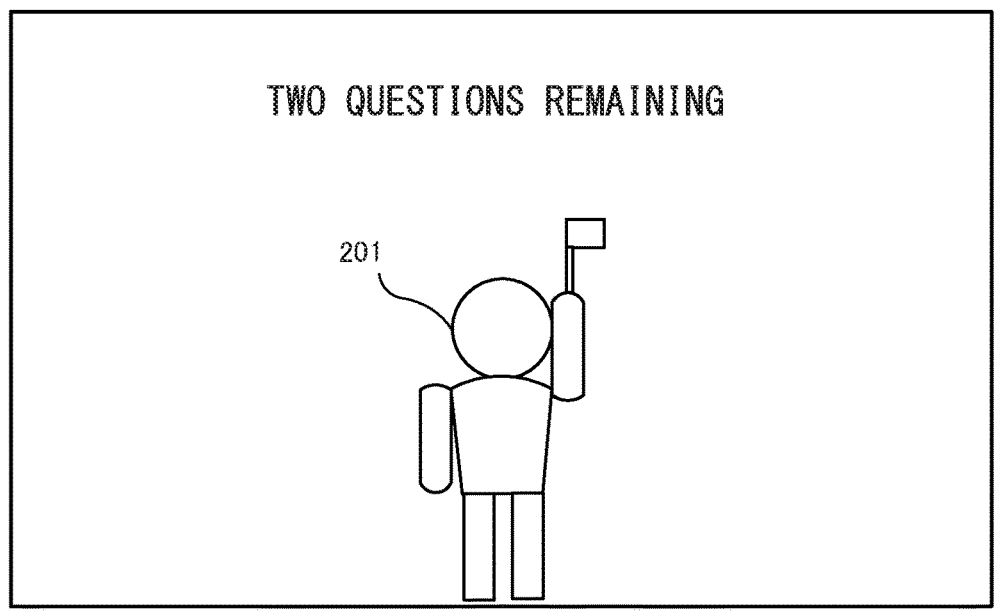
FIG. 14 shows a non-limiting example of a game screen.
Figure 15:
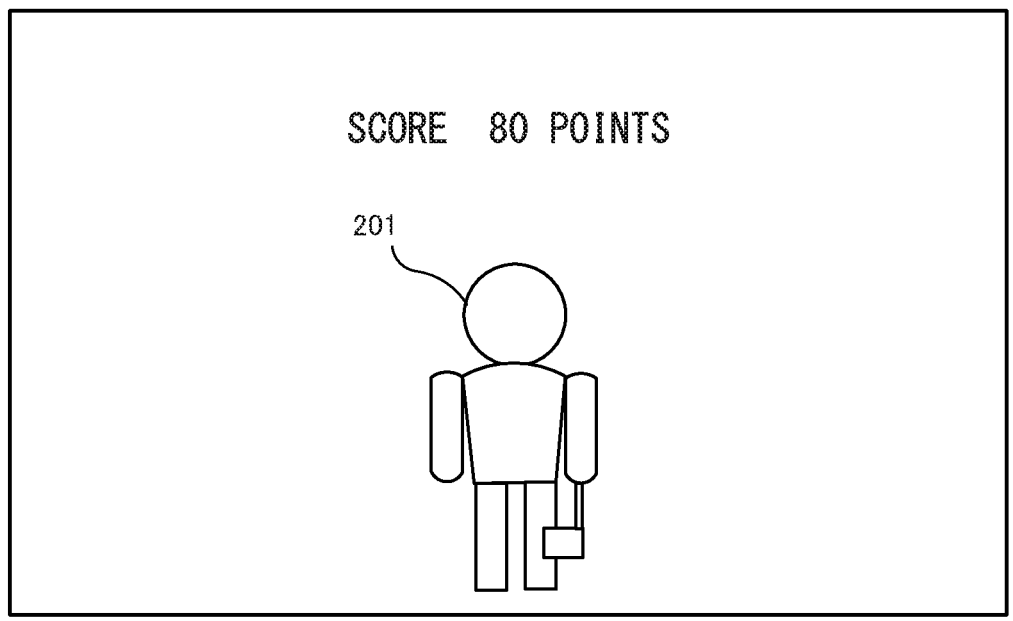
FIG. 15 shows a non-limiting example of a game screen.

After the presentation of the model example is finished, a preparatory screen for answering is displayed as shown in FIG. 13. In this screen, a player character 201 holding a flag is displayed, and an instruction for causing the player to hold the controller in the horizontal orientation is displayed. Accordingly, the player holds the controller in the orientation as shown above in FIG. 8. When a state in which the orientation of the controller is horizontal and at rest has continued for a predetermined time period, it is determined that the player is ready for answering. Then, although not shown, a message or the like to indicate start of answering is displayed as appropriate, and an input of an answer is started. Subsequently, the player performs answering operations. That is, the player sequentially performs operations of swinging the controller in directions that the player thinks are in accordance with the order indicated by the model example (depending on the player's own memory). Namely, direction inputs are sequentially performed. In this example, the number of questions are four, and one question corresponds to one swing operation. Therefore, the player needs to perform four swing operations in total. FIG. 14 shows an example of a screen when the answer is being inputted. The player character 201 in the screen is swinging the flag in a predetermined direction in accordance with the player's operation of swinging the controller. In addition, information indicating the number of questions remaining is also displayed above the player character 201. In this example, every time one direction input (one swing operation) is performed, whether the inputted direction is correct or incorrect is indicated. In another example, correct/incorrect indication may be collectively displayed after inputs for four questions are finished. When an input is incorrect, the answering may be finished here. The correct/incorrect indication is presented by displaying a circle or x mark on the screen as appropriate, for example. Then, when the answer inputs are finished, a result screen as shown in FIG. 15 is displayed. In the result screen, the number of correct answers, the score, and the like are displayed.

In the case of performing direction inputs by continuously swinging the controller as in this example, between the inputs, there is a possibility that an input in a direction different from the direction that the player originally desires to input occurs and thus erroneous determination is performed. That is, depending on the way (habit) of the player's swing, some motion in the trajectory of change in the orientation of the controller (orientation change process) might be determined to be an input in a direction different from an intended direction. For example, in the case of swinging rightward and then upward, even though the player thinks that the player is raising the arm straightly upward, the controller (head thereof) might not be directed straightly upward but might be in an orientation tilted obliquely rightward, and at this time, there is a possibility that the swing is determined to be a rightward swing. In addition, when the controller is in an intermediate orientation before completely changing into the upward orientation, there is a possibility that the swing is determined to be a rightward swing at some timing. In addition, for example, in the case of swinging the controller rightward and then upward, depending on the player's way of swinging, the habit, or the like, an input in the downward direction can occur momentarily before swinging upward (for example, unconsciously "holding" in the downward direction in order to swing in the upward direction). In such a case, even though the player intends to swing the controller from right to up, there is a possibility that it is erroneously determined that inputs from right to down are performed. In view of such problems, in the exemplary embodiment, input determination control is performed for decreasing the possibility of erroneous determination in the case of continuously performing direction inputs, so as to facilitate a correct direction input. Hereinafter, the summary of the input determination control according to the exemplary embodiment will be described.

In the exemplary embodiment, a projection vector is used for determination of the input direction. Specifically, a virtual plane (hereinafter, projection plane) perpendicular to the frontward direction of the player is assumed. On the projection plane, an orientation vector in the y-axis direction (see FIG. 4 and FIG. 5) of the controller is projected while the vector in the reference orientation as described later is set as an origin, whereby a projection vector is calculated. Then, input direction determination is performed on the basis of the projection vector.

Figure 16:
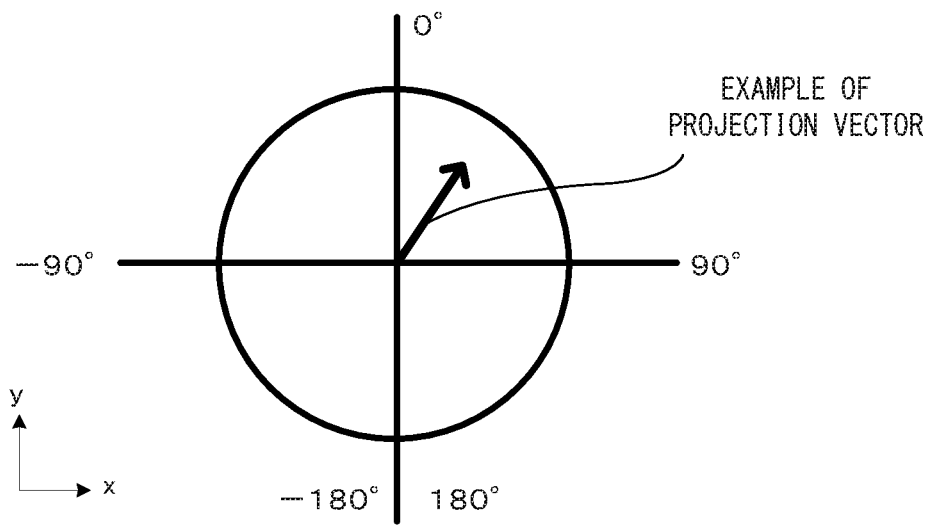
FIG. 16 shows a non-limiting example of the definition of the angle of a projection vector on a projection plane.

Here, as a premise for the input direction determination according to the exemplary embodiment, the definition of the angle of the projection vector on the projection plane in the exemplary embodiment will be described. FIG. 16 shows the definition of the angle of the projection vector on the projection plane. As shown in FIG. 16, the right side of the y axis is allocated as a region of 0 degrees to 180 degrees, and the left side of the y axis is allocated as a region of 0 degrees to −180. In the following description, for the angle of the projection vector, such a definition is used as a premise.

Figure 17:
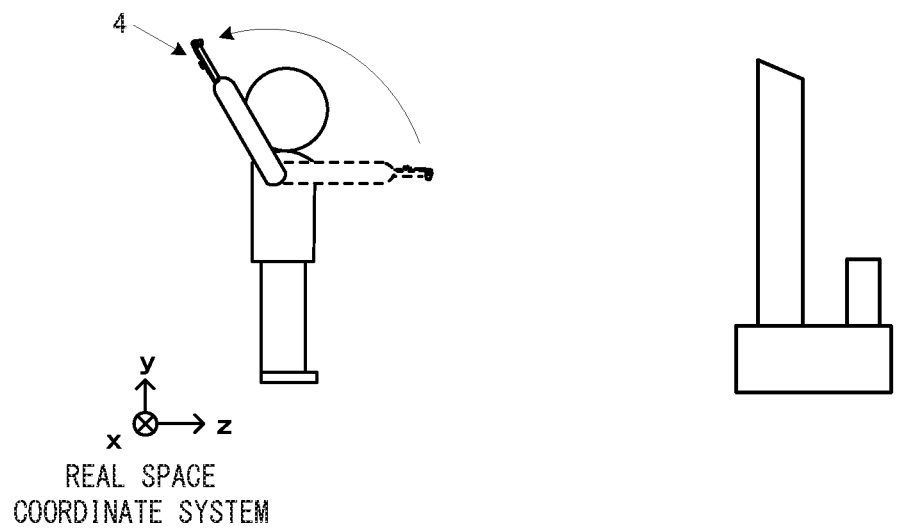
FIG. 17 illustrates a non-limiting example of the magnitude of input.

In addition, as a premise for the input direction determination according to the exemplary embodiment, the definition of "magnitude of input" in the exemplary embodiment will be described. The magnitude of input is the magnitude of a direction input performed by an operation of the player swinging the controller in the up/down/left/right direction. Basically, the projection vector becomes a greater vector as the player directs the controller upward, downward, leftward, or rightward more definitely. However, it is conceivable that, when the player swings the controller, the controller is excessively moved to be directed frontward relative to the projection plane. For example, the case of swinging the right controller 4 upward is assumed. In this case, if the momentum of the swing is great, it is conceivable that the right controller 4 is not stopped with the head of the right controller 4 directed straightly upward, but comes into an orientation slightly tilted backward of the player, as shown in FIG. 17. In such a case, the magnitude of input is greater as compared to a state in which the head of the right controller 4 is directed straightly upward, but the magnitude of the projection vector is smaller as compared to a state in which the head of the right controller 4 is directed straightly upward. Considering this, in the exemplary embodiment, the magnitude of input is calculated as follows.

Figure 18:
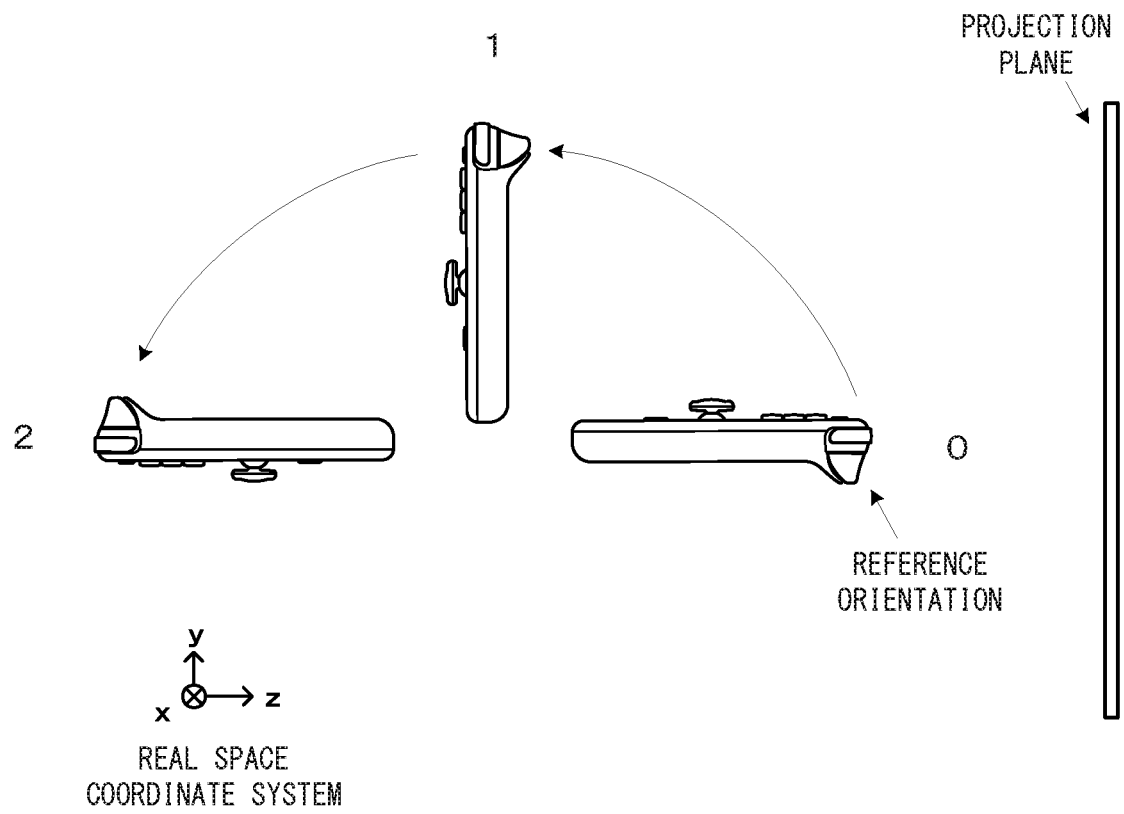
FIG. 18 illustrates a non-limiting example of the magnitude of input.

The case of upward swing will be described as an example. First, regarding the correspondence between the range of the magnitude of input and change in the orientation, values in a range of 0 to 2 are allocated as shown in FIG. 18. In FIG. 18, the magnitude of input in the reference orientation is defined as 0, and the magnitude of input in a state in which the head of the controller is directed straightly upward (orientation in which the y axis of the controller is parallel to the projection plane) is defined as 1. Further, the magnitude of input in a state in which the head of the controller is directed in the negative direction of the z axis in the real space coordinate system is defined as 2.

Under such an allocation, the orientation in which the head of the controller is slightly tilted backward of the player (orientation in which the controller is directed frontward relative to the projection plane) as shown in FIG. 17 will be used as an example. In this case, the magnitude of input is calculated as "2-magnitude of projection vector". For example, it is assumed that the magnitude of the projection vector in the orientation shown in FIG. 17 is 0.8. In this case, the magnitude of input is calculated as 2−0.8=1.2. That is, whether or not the controller is in an orientation directed frontward relative to the projection plane is determined, and if a result of the determination is affirmative, the magnitude of input is calculated as "2-magnitude of projection vector". On the other hand, if a result of the determination is negative, the magnitude of the projection vector is calculated directly as the magnitude of input. Whether or not the controller is in an orientation directed frontward relative to the projection plane can be determined on the basis of outputs from the inertial sensors (e.g., rotation angle of the controller). In the exemplary embodiment, the magnitude of input is calculated as a value that varies in a range of 0 to 2 by the above calculation method.

Next, various thresholds used for input direction determination in the exemplary embodiment and the determination method using these will be described. Basically, the input direction is determined by referring to the direction of the projection vector on the projection plane. In the exemplary embodiment, as determination results, five types, i.e., "up", "down", "left", "right", and "none" are obtained. In addition, as the thresholds used for the determination, an angle that is determined to be an upward direction, an angle that is determined to be a leftward direction, an angle that is determined to be a rightward direction, and an angle that is determined to be a downward direction, are set. In addition, a magnitude of input required for each direction is also set (for example, as compared to the up/down direction, a direction input in the left/right direction is required to be a more definite input).

In the exemplary embodiment, the thresholds used for the above determination are roughly classified into three types of thresholds. Then, on the basis of the magnitude of input, three types of determinations are performed in stages using the three types of thresholds. In the following description, the three types of determinations are referred to as "first determination", "second determination", and "third determination". These determinations are performed in the order of "first determination", "second determination", "third determination", and if it is determined that there is any direction input in any of the determinations, the "present input direction" becomes definite there. In the determination, input determination control is performed in which, mainly, the size of an area where the input is determined to be correct on the projection plane is adjusted in accordance with the correct direction in each question, thereby decreasing the possibility of erroneous determination and facilitating a correct direction input. Hereinafter, these three types of determinations will be described.

[First Determination]

First, the first determination will be described. In the first determination, the case where "the magnitude of input is great to a certain extent" is assumed. That is, the first determination is performed when an input that is great to a certain extent is performed. In this example, basically, control is performed so as to adjust the size of an area where the input is determined to be a correct direction for each question on the projection plane, but in the case where the input is great to a certain extent, it is considered that the player completely indicates a predetermined direction. Therefore, in this case, the control of increasing the angle (area size) in which the input is determined to be a correct direction more than necessary is refrained as much as possible. This is based on the standpoint that, even if the input is performed in an incorrect direction, judging from such a great magnitude of the input, this merely means that the player really makes a wrong direction input.

Figure 19:
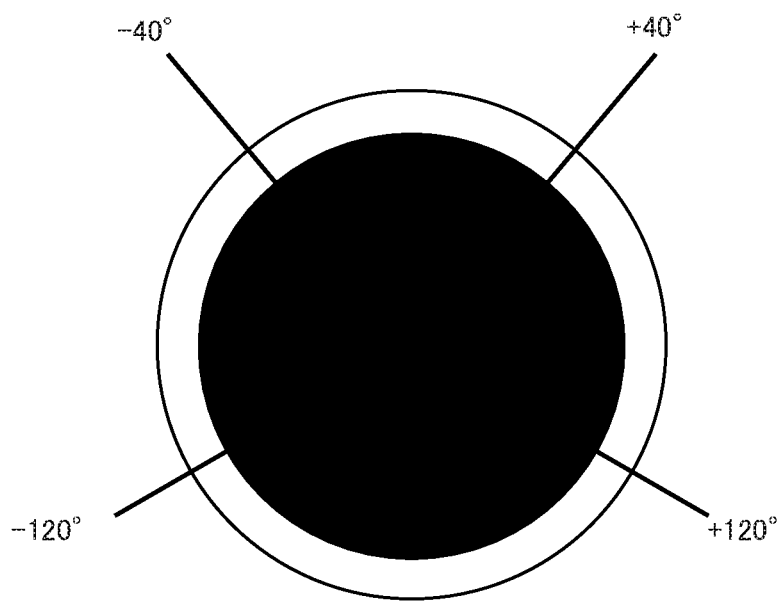
FIG. 19 shows a non-limiting example of a first threshold.

FIG. 19 schematically shows a first threshold used in the first determination. This is conceptually a state in which the projection plane is roughly divided into four areas. In FIG. 19, the center of the projection plane is the origin. The origin corresponds to the reference orientation (projection vector thereof). In FIG. 19, a black filled part represents a non-determination area. This area indicates the minimum magnitude of input needed for being determined to be a valid direction input. In the exemplary embodiment, the magnitude of input corresponding to the non-determination area in the first threshold is 0.9. That is, the first determination is performed when an input with a magnitude greater than 0.9 occurs.

In the first threshold, first, an area where the input is determined to be the upward direction on the projection plane (hereinafter, referred to as upward area) is an area that is outside the non-determination area and in a range of −40 degrees to +40 degrees. In addition, an area where the input is determined to be the rightward direction (hereinafter, referred to as rightward area) is an area that is outside the non-determination area and in a range of +40 degrees to +120 degrees. An area where the input is determined to be the leftward direction (hereinafter, referred to as leftward area) is an area that is outside the non-determination area and in a range of −40 degrees to −120 degrees. An area where the input is determined to be the downward direction (hereinafter, referred to as downward area) is an area that is outside the non-determination area and in a range of −120 degrees to −180 degrees and a range of +180 degrees to +120 degrees. Hereinafter, the boundary line representing the angle at the boundary between the areas corresponding to the respective directions is referred to as angle threshold.

Figure 20:
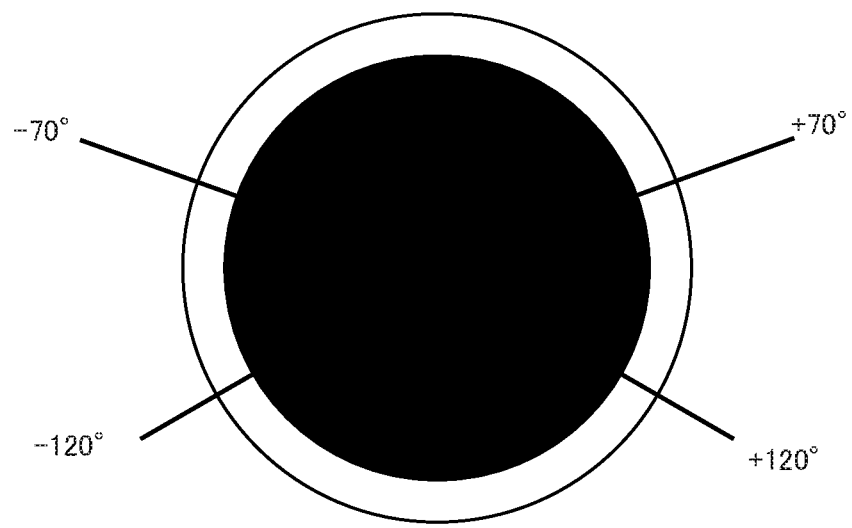
FIG. 20 shows a non-limiting example of the first threshold after adjustment.
Figure 21:
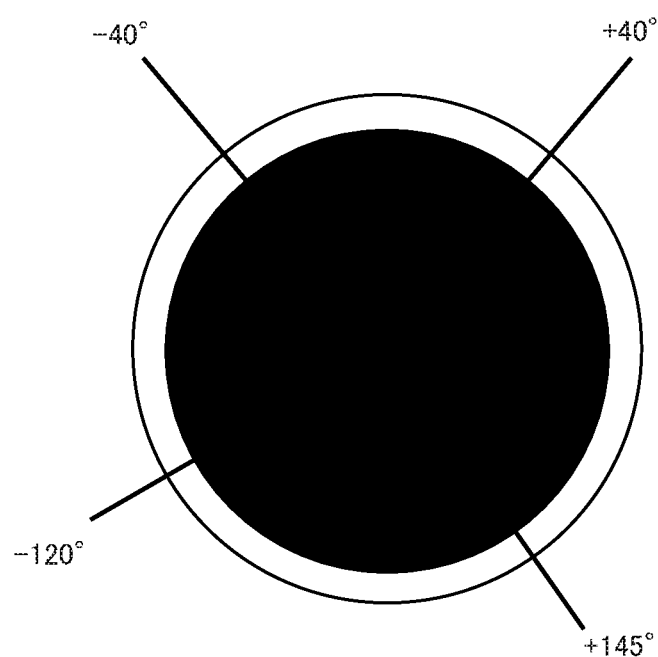
FIG. 21 shows a non-limiting example of the first threshold after adjustment.
Figure 22:
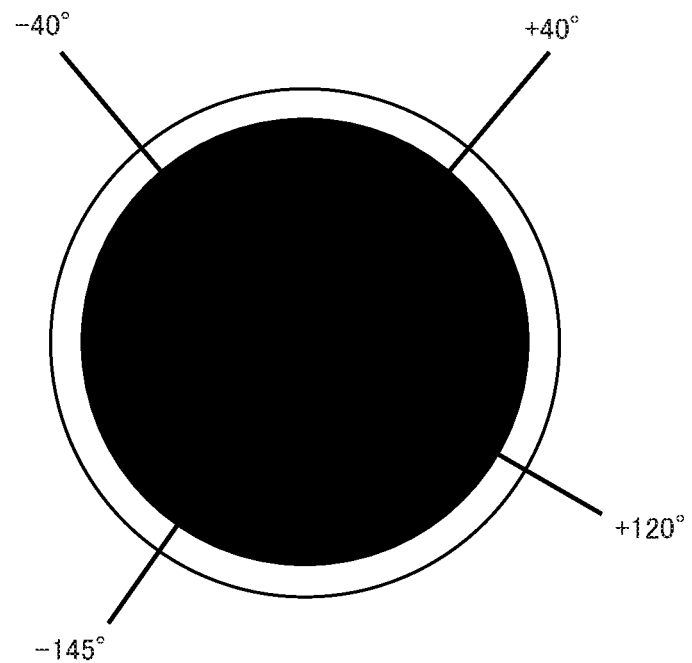
FIG. 22 shows a non-limiting example of the first threshold after adjustment.

In the first determination, the angle thresholds in the first threshold for which the angles are set as described above is changed for each question in accordance with the correct direction thereof, and then the direction of the projection vector is determined. Specific examples of this change will be shown below. First, in the case where the correct direction is "upward", the angle threshold range of the upward area is changed to −70 degrees to +70 degrees, as shown in FIG. 20. That is, by increasing the central angle of the upward area, the upward area itself is enlarged to a certain extent (these changed values are also intended to prevent the area from being enlarged more than necessary, as described above). In the case where the correct direction is "rightward", the angle threshold range of the rightward area is changed to +40 degrees to +145 degrees, as shown in FIG. 21. That is, the rightward area is enlarged to a certain extent. In the case where the correct direction is "leftward", the angle threshold range of the leftward area is changed to −40 degrees to −145 degrees, as shown in FIG. 22. That is, the leftward area is enlarged to a certain extent. In the case where the correct direction is "downward", the angle thresholds are not changed. The above specific changed values are merely examples, and in another exemplary embodiment, other values may be used in accordance with the game contents or the like.

Thus, for each question, the area in the direction corresponding to the correct direction is enlarged, so that the input is more likely to be determined to be a correct input in the direction.

[Adjustment with Last Input Taken into Consideration]

In the exemplary embodiment, in addition to the adjustment according to the correct direction as described above, adjustment with the last input direction taken into consideration is also performed. This is performed considering that an erroneous input is likely to occur depending on flow of the player's operation of inputting directions. That is, control is also performed so that, depending on a combination of the direction inputted by the player last time (for last question) and a correct direction that will be inputted from now, the size of the area corresponding to the correct direction is further changed or not changed. For example, the case where the last input direction is "leftward" or "rightward" and the correct direction to be inputted next is "upward", is assumed. In this case, when the player tries to move the controller "upward", the player might turn the wrist once and thus it might be determined that a "downward" input is performed. Considering such a situation, in the case of input combination from "left" or "right" to "upward", the angle threshold ranges for the left and the right are enlarged so that the "downward" area is reduced, and thus the input is less likely to be determined to be a "downward" input. Conversely, it is also possible that such control as to enlarge the determination areas as described above is not performed, depending on the combination of directions.

In the exemplary embodiment, in the first determination, the above adjustment with the last input taken into consideration is controlled as follows. That is, in the case where the correct direction is "upward" and the last input direction is "downward" (in the case of combination from downward to upward), adjustment of enlarging the angle threshold range for the upward area as described above is not performed. This is because, in the case of movement from down to up, it is considered that the input direction is less likely to deviate.

[Measure for Case where Input Determination Occurs without Orientation Change]

In the exemplary embodiment, in addition to the adjustment with the last direction taken into consideration as described above, adjustment for preventing input determination from occurring even though the controller is not moved is also performed. For example, the case where the correct direction in the first question is "rightward" and the correct direction in the second question is "upward", is assumed. In this case, the thresholds as shown in FIG. 21 are used for determination in the first question, and the thresholds as shown in FIG. 20 are used for determination in the second question. In the first question, the angle of the projection vector corresponding to the player's input is assumed to be +41 degrees. In this case, in the first question, since the input is within the range of the rightward area, the input is determined to be a "rightward" direction input. Thereafter, it is assumed that the game shifts to the processing for the second question and the controller is not moved. In this case, in determination for the second question, the direction at +41 degrees is included in the upward area, and therefore, if the determination is performed in this state, the input is determined to be an upward direction input (in other words, an input in a direction other than the rightward direction) even though the player has not moved the controller (the orientation is not changed at all). Considering this, in the exemplary embodiment, in the case where the present input direction can be determined to be a different direction between both questions (even though the orientation of the controller has not changed), control is also performed so that an angle that is the present input angle (=last input angle) plus or minus 5 degrees is set as a new angle threshold. Whether to perform plus-direction adjustment or minus-direction adjustment is determined so that the present input direction becomes the input direction in the last question. For example, in the above case, in order that +41 degrees which is the angle of the present projection vector is included in the "rightward" direction, +36 degrees obtained by subtracting 5 degrees from +41 degrees is set as an angle threshold for the boundary between the upward direction and the rightward direction.

[Second Determination]

Next, the second determination will be described. In the exemplary embodiment, the second determination is performed when the magnitude of input is 0.9 or smaller. That is, when the condition for performing the first determination is not satisfied, the second determination is performed. For the second determination, thresholds corresponding to the upward, downward, leftward, and rightward directions are prepared in advance (i.e., preset). These thresholds are referred to as second thresholds. Hereinafter, with reference to the drawings, an example of the second threshold corresponding to each direction will be described.

Figure 23:
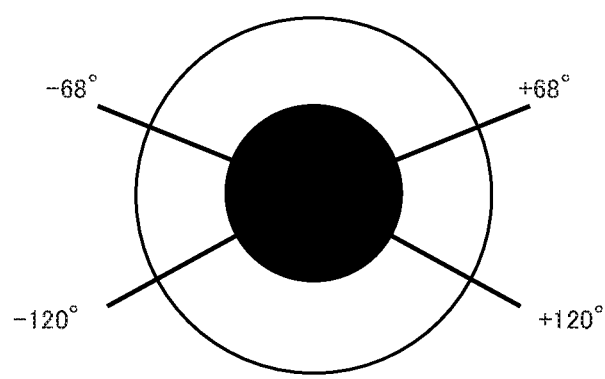
FIG. 23 shows a non-limiting example of a second threshold in the case where the correct direction is the upward direction.

FIG. 23 shows an example of the second threshold used in the case where the correct direction is the upward direction (hereinafter, referred to as second upward direction threshold). In the second upward direction threshold, the magnitude of input needed is set at 0.5 for all of the upward, downward, leftward, and rightward directions. The upward area is a range of −68 degrees to +68 degrees. The rightward area is a range of +68 degrees to +120 degrees, and the leftward area is a range of −68 degrees to −120 degrees. A range of −120 degrees to −180 degrees and a range of +180 degrees to +120 degrees are the downward area.

Figure 24:
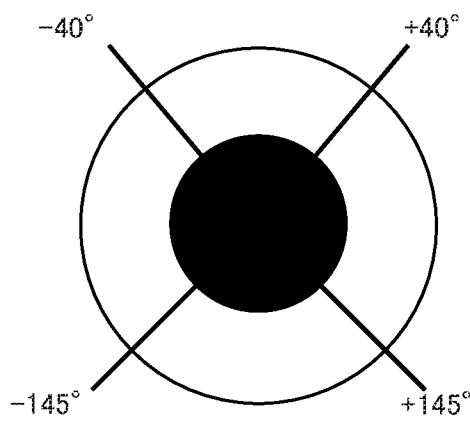
FIG. 24 shows a non-limiting example of the second threshold in the case where the correct direction is the leftward or rightward direction.

Next, FIG. 24 shows an example of the second threshold used in the case where the correct direction is the leftward or rightward direction (hereinafter, referred to as second leftward/rightward direction threshold). In the second leftward/rightward direction threshold, the magnitude of input needed is set at 0.5 for all of the upward, downward, leftward, and rightward directions. The upward area is a range of −40 degrees to +40 degrees. The rightward area is a range of +40 degrees to +145 degrees, and the leftward area is a range of −40 degrees to −145 degrees. The downward area is a range of −145 degrees to −180 degrees and a range of +180 degrees to +145 degrees.

Next, FIG. 25 shows an example of the second threshold used in the case where the correct direction is the downward direction (hereinafter, referred to as second downward direction threshold). In the second downward direction threshold, the magnitude of input needed is set at 0.15 for all of the upward, downward, leftward, and rightward directions. The upward area is a range of −40 degrees to +40 degrees. The rightward area is a range of +40 degrees to +120 degrees, and the leftward area is a range of −40 degrees to −120 degrees. The downward area is a range of −120 degrees to −180 degrees and a range of +180 degrees to +120 degrees.

As described above, a plurality of second thresholds are selectively used in accordance with the correct direction, whereby the input is more likely to be determined to be correct for each direction.

Figure 26:
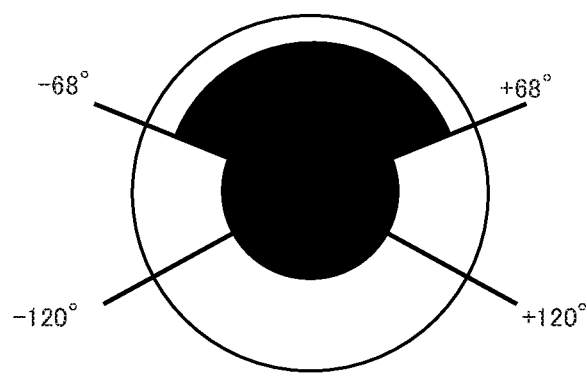
FIG. 26 shows a non-limiting example of the second threshold after adjustment.
Figure 27:
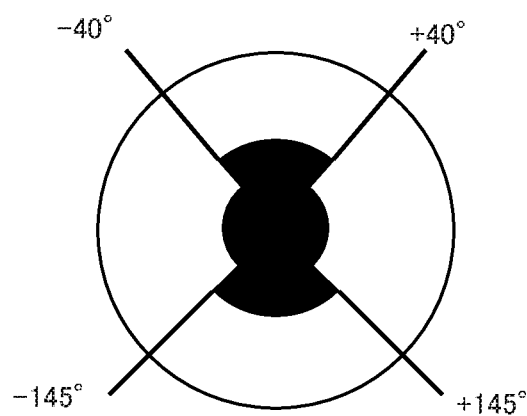
FIG. 27 shows a non-limiting example of the second threshold after adjustment.

Also in the second determination, as in the first determination, adjustment with the last input taken into consideration is performed. Specifically, for the above second threshold, the following adjustment is further performed. First, in the case where the correct direction is the upward direction and the last input direction is the leftward or rightward direction, the second upward direction threshold is adjusted as shown in FIG. 26. That is, the angle thresholds are not changed but the magnitude of input (size of non-determination area) needed is adjusted. Specifically, the magnitude of input needed for upward direction determination is changed from 0.5 to 0.86. In the case where the correct direction is the leftward direction and the last input direction is the rightward direction or in the case where the correct direction is the rightward direction and the last input direction is the leftward direction, the second leftward/rightward direction threshold is adjusted as shown in FIG. 27. That is, the magnitude of input needed for the rightward direction and the leftward direction is changed from 0.5 to 0.3 (as a result, a motion of moving from the leftward/rightward direction to the opposite direction can be detected even if the magnitude of input is small).

In this example, in the second determination, adjustment with the last direction taken into consideration is not particularly performed in the case where the correct direction is the downward direction.

Also in the second determination, adjustment for coping with input determination in the case where the orientation of the controller is not changed, as described in the first determination, is performed.

[Third Determination]

Figure 28:
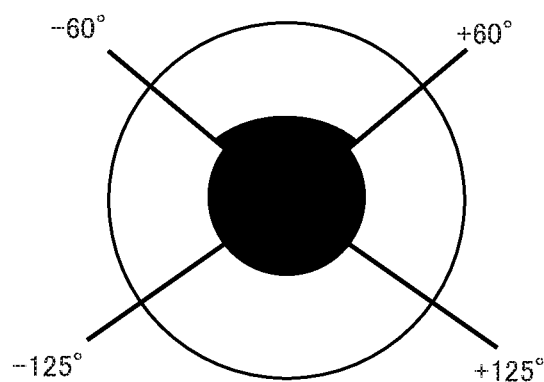
FIG. 28 shows a non-limiting example of a third threshold.

Next, the third determination will be described. In the exemplary embodiment, the third determination is performed when it is determined that there is no direction input in the second determination. FIG. 28 shows a schematic view of the third threshold used in the third determination. In the third threshold, the magnitude of input needed is set at 0.45 for the upward direction, and 0.4 for the other directions. The upward area is a range of −60 degrees to +60 degrees. The rightward area is a range of +60 degrees to +125 degrees, and the leftward area is a range of −60 degrees to −125 degrees. The downward area is a range of −125 degrees to −180 degrees and a range of +180 degrees to +125 degrees.

In the third determination, in the case where the correct direction is the downward direction, the following adjustment is performed for the third threshold shown in FIG. 28, to perform input direction determination. That is, as shown in FIG. 29, the size of the rightward area is changed to a range of +60 degrees to +120 degrees, and the size of the leftward area is changed to a range of −60 degrees to −120 degrees (that is, the downward area is slightly enlarged).

Figure 30:
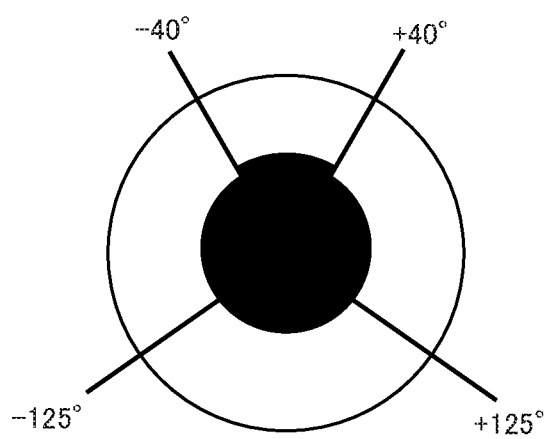
FIG. 30 shows a non-limiting example of the third threshold after adjustment.
Figure 31:
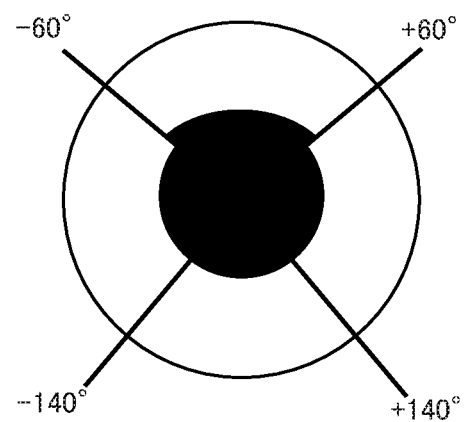
FIG. 31 shows a non-limiting example of the third threshold after adjustment.

Also in the third determination, as in the first and second determinations, adjustment with the last input taken into consideration is performed. Specifically, the following adjustment is further performed for the above third threshold. First, in the case where the correct direction is the upward direction and the last input direction is the downward direction, the size of the upward area is changed to a range of −40 degrees to +40 degrees, as shown in FIG. 30. In the case where the correct direction is the upward direction and the last input direction is the leftward or rightward direction, the size of the rightward area is changed to a range of +60 degrees to +140 degrees and the size of the leftward area is changed to a range of −60 degrees to −140 degrees, as shown in FIG. 31.

Figure 29:
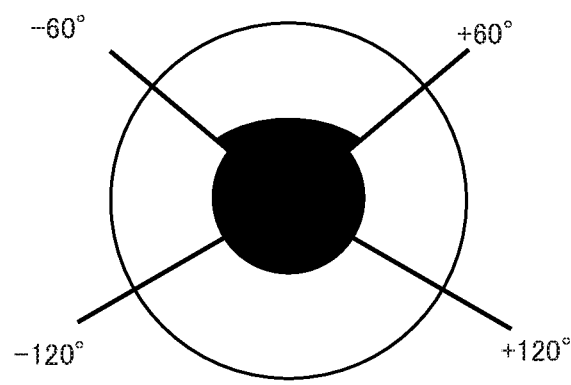
FIG. 29 shows a non-limiting example of the third threshold after adjustment.
Figure 32:
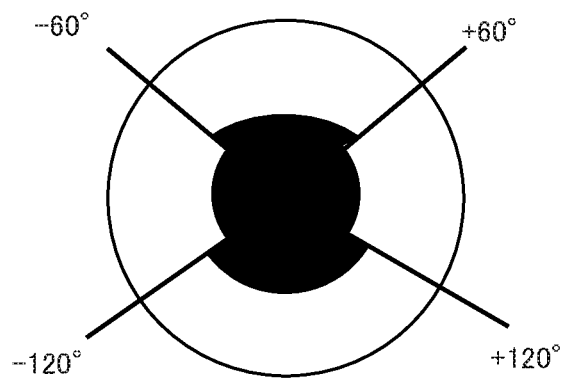
FIG. 32 shows a non-limiting example of the third threshold after adjustment.

Next, in the case where the correct direction is the downward direction and the last input direction is the upward direction, in addition to the above-described change as shown in FIG. 29, the magnitude of input needed for the downward direction is changed from 0.4 to 0.45 as shown in FIG. 32.

Also in the third determination, adjustment for coping with input determination in the case where the orientation of the controller is not changed, as described in the first determination, is performed.

Thus, by providing the third determination, it is possible to determine the input direction even if the input is such an input that is not determined to be a direction input in the second determination (the magnitude of the input is rather small).

The "present input direction" can be determined by the determination method as described above. Here, in the exemplary embodiment, the determined "present input direction" is not immediately made definite as the "answer for the question", but after a time period corresponding to a predetermined number of frames has elapsed, the determined "present input direction" is made definite as the "answer for the question". Specifically, in the case where the "present input direction" is the correct direction, the "present input direction" is made definite as the correct answer when the direction input has continued for five frames. In the case where the "present input direction" is incorrect, the "present input direction" is made definite as an incorrect answer when the direction input has continued for twelve frames. Thus, when the controller is moved with a trajectory passing across an incorrect direction, the incorrect direction can be prevented from being erroneously detected as a definite answer.

As described above, in the exemplary embodiment, three types of thresholds are used for determining the input direction, and for each type of threshold, the configuration thereof is changed in accordance with the correct direction. Thus, the player's input can become more likely to be determined to be an input in the correct direction.

The above-described specific values in each type of threshold are merely an example, and values according to the game contents may be set as appropriate.

Next, with reference to FIG. 33 to FIG. 41, the game process executed in the exemplary embodiment will be described in more detail.

[Used Data]

Figure 33:
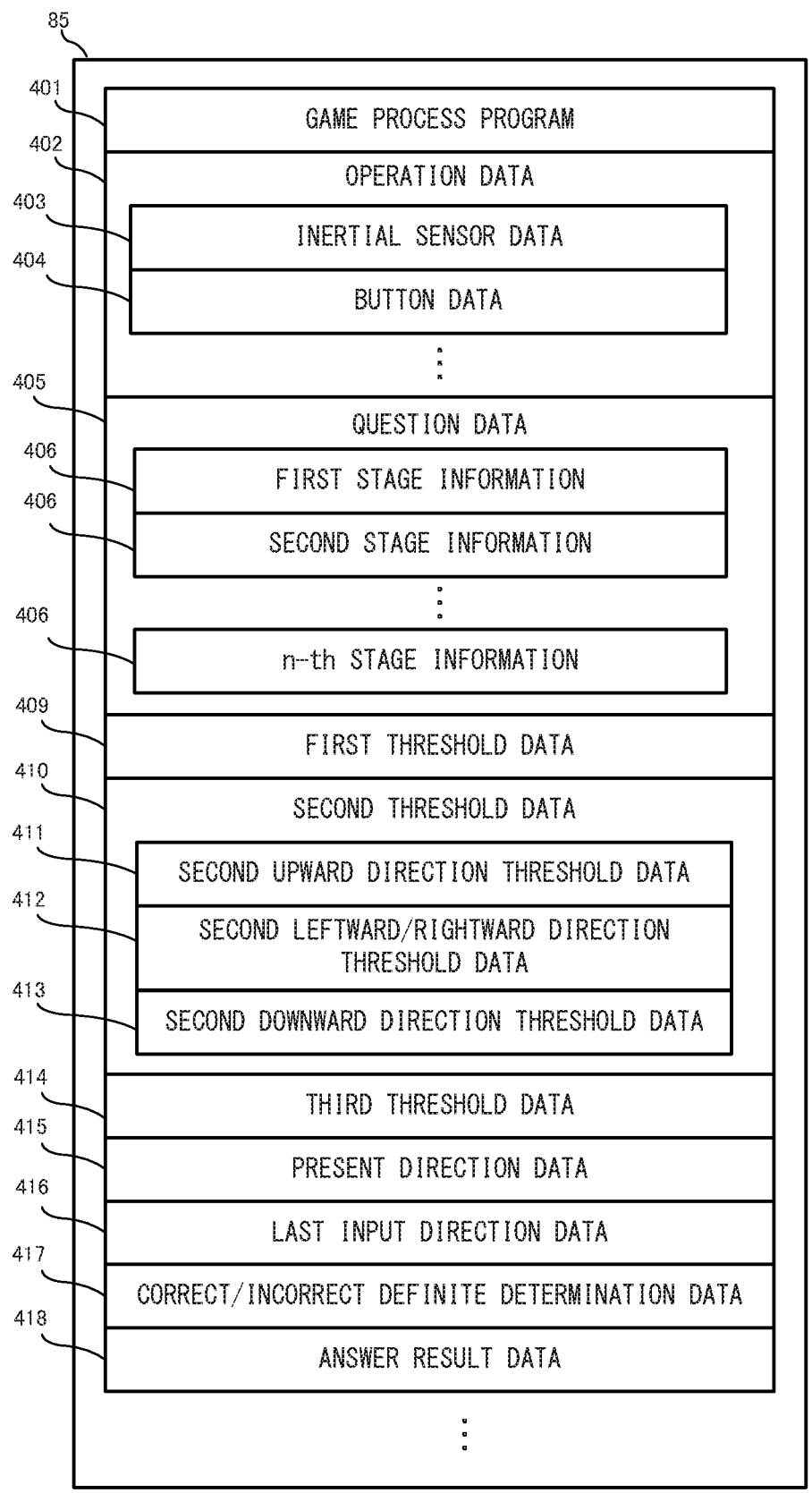
FIG. 33 shows a non-limiting example of a program and information to be stored in a DRAM 85 of the main body apparatus 2.

First, various data used in this game system 1 will be described. FIG. 33 shows an example of a program and information to be stored in the DRAM 85 of the main body apparatus 2. The DRAM 85 stores a game process program 401, operation data 402, question data 405, first threshold data 409, second threshold data 410, third threshold data 414, present direction data 415, last input direction data 416, correct/incorrect definite determination data 417, answer result data 418, and the like.

The game process program 401 is a program for executing the game process according to the exemplary embodiment. Specifically, this is a program for executing the process shown in the flowchart in FIG. 35 described later.

The operation data 402 is data indicating various operations performed on the controller. The operation data 402 includes inertial sensor data 403, button data 404, and the like. The inertial sensor data 403 is acceleration data and angular velocity data outputted from the acceleration sensors 104, 114 and the angular velocity sensors 105, 115. The button data 404 is data indicating whether each button is pressed.

The question data 405 is data regarding each question to be presented in this game process. Here, in this game, correct directions for a plurality of questions are presented in a certain order, and the player is caused to perform inputs in this order. The set of questions to be presented at one time is referred to as "stage" in this example. That is, a plurality of questions are included in one stage. In the question data 405, data is stored on a stage basis. Specifically, plural sets of stage information 406 are stored in the question data 405. In FIG. 33, the stage information is shown as n-th stage information (n is an integer starting from 1). FIG. 34 shows an example of the data structure of the stage information 406. The stage information 406 is configured as table-format data having items of question presentation order 4061 and correct direction information 4062. The question presentation order 4061 is information indicating the order in which the questions are to be presented. In this example, this corresponds to the order in which the flag is to be swung. The correct direction information 4062 is information indicating correct directions for the respective questions.

Returning to FIG. 33, the first threshold data 409 is data that defines the details of the first threshold as shown in FIG. 19. That is, the first threshold data 409 is data that defines the magnitude of input needed and the angle thresholds corresponding to the up/down/left/right boundaries.

The second threshold data 410 is data that defines the details of the second threshold. In this example, the second threshold data 410 includes second upward direction threshold data 411, second leftward/rightward direction threshold data 412, and second downward direction threshold data 413. These data respectively correspond to the second upward direction threshold, the second leftward/rightward direction threshold, and the second downward direction threshold as described in FIG. 23 to FIG. 25.

In the exemplary embodiment, thresholds used for rightward direction determination and leftward direction determination in the second determination are substantially the same, and therefore the same common data is used between the rightward direction and the leftward direction. However, in another exemplary embodiment, thresholds with different configurations for the leftward direction and the rightward direction may be used, and respective different data therefor may be stored.

Next, the third threshold data 414 is data that defines the details of the third threshold described above with reference to FIG. 28.

The present direction data 415 is data indicating the "present input direction". That is, the present direction data 415 is data indicating the input direction at the present frame that is determined through the above-described determination. As the initial value thereof, information indicating "unspecified" which indicates that the present direction has not been determined yet, is set.

The last input direction data 416 is data indicating the input direction that has become definite as the answer for the last question (whether correct or incorrect).

The correct/incorrect definite determination data 417 is data to be used in processing for making the "answer for the question" definite after a time period corresponding to a predetermined number of frames has elapsed. Specifically, in this data, the history of the present direction data 415 can be stored for up to the past twelve frames. Data for a frame beyond twelve frames is deleted from the oldest one.

The answer result data 418 is data for storing the player's answer contents for the respective questions. For example, this data indicates whether or not each question is unanswered, and if the answer is not unanswered, indicates the answer content. This data is used for final score calculation and the like. The progress of answering (the number of answered questions) can also be obtained on the basis of this data.

Besides, although not shown, various data to be used in the game process, such as data indicating the projection vector calculated in the process, and image data of the model example presenting character, the player character, and the like, are also stored in the DRAM 85.

[Detailed Flowchart]

Figure 35:
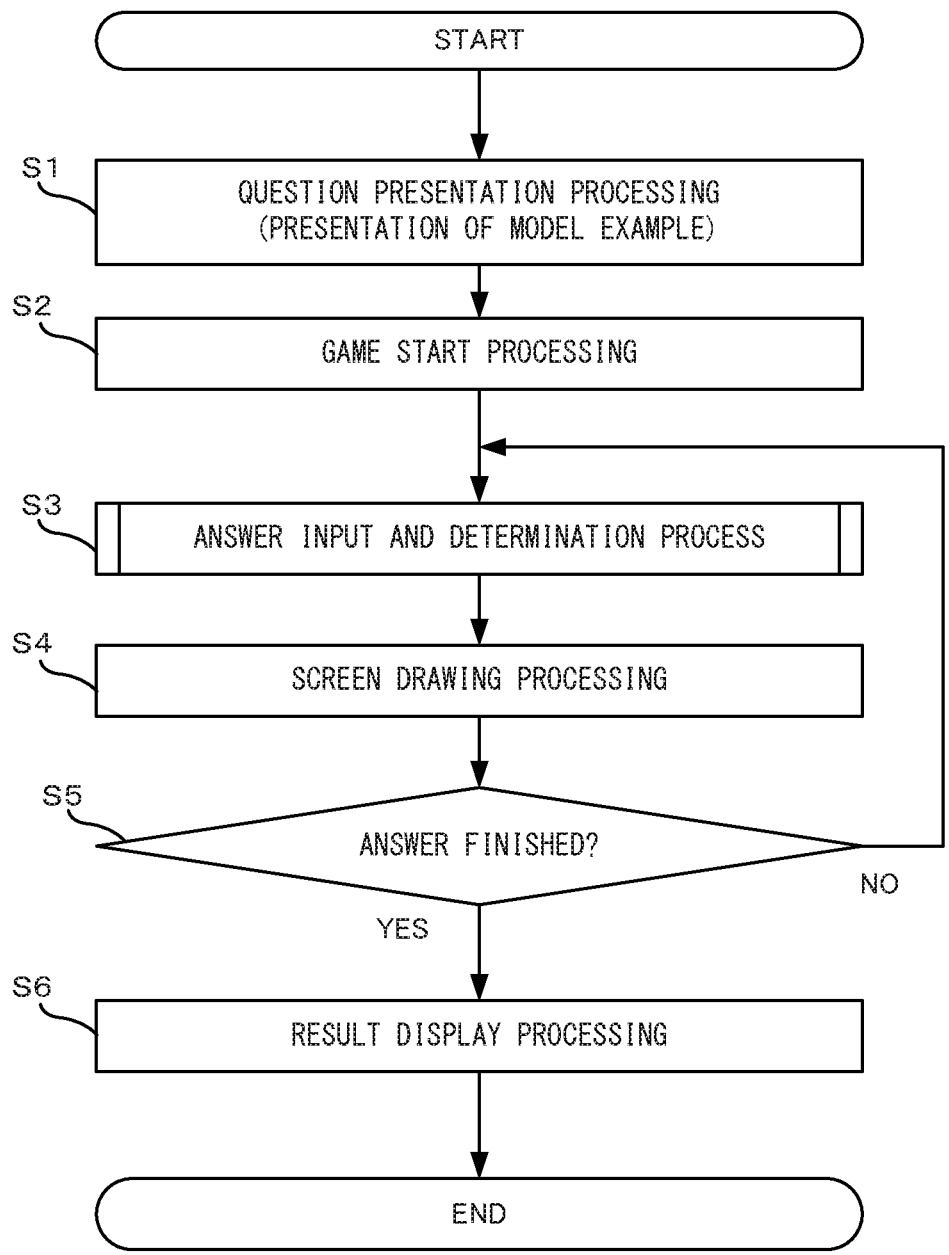
FIG. 35 is a flowchart showing the details of a game process in the exemplary embodiment.

Next, with reference to the flowchart shown in FIG. 35, flow of the game process executed by the game system 1 will be described. The processing loop in steps S3 to S5 in FIG. 35 is repeatedly executed every frame (e.g., ¹⁄₆₀ s), for example.

When the game is started, various data to be used in the game process are initialized, and then the processor 81 executes question presentation processing in step S1. This is processing for presenting a "model example" as shown in FIG. 11, to the player. Specifically, the processor 81 acquires the stage information 406 corresponding to the stage for presenting questions at this time, from the question data 405. Subsequently, the processor 81 generates and displays a question presentation screen as shown in FIG. 11. Then, the processor 81 presents correct directions, i.e., the order in which the controller (flag) is to be swung, to the player, on the basis of the question presentation order 4061 and the correct direction information 4062 included in the stage information 406. Specifically, the processor 81 causes the model example presenting character to perform a motion of swinging the flag object in the correct direction for each question in the order indicated by the question presentation order 4061.

After the question presentation processing is finished, next, in step S2, the processor 81 executes game start processing. Specifically, the processor 81 displays a preparatory screen as shown in FIG. 13 and an indication for promoting the player to hold the controller in the reference orientation. Thereafter, when it is confirmed that the controller is in the reference orientation, for example, countdown for starting answer input is displayed and reception of answer inputs from the player is started. The confirmation of the reference orientation is performed through, for example, determination for whether or not the state in which the controller is horizontal and at rest as shown in FIG. 8 or the like has continued for a predetermined number of frames, on the basis of the inertial sensor data 403.

Figure 36:
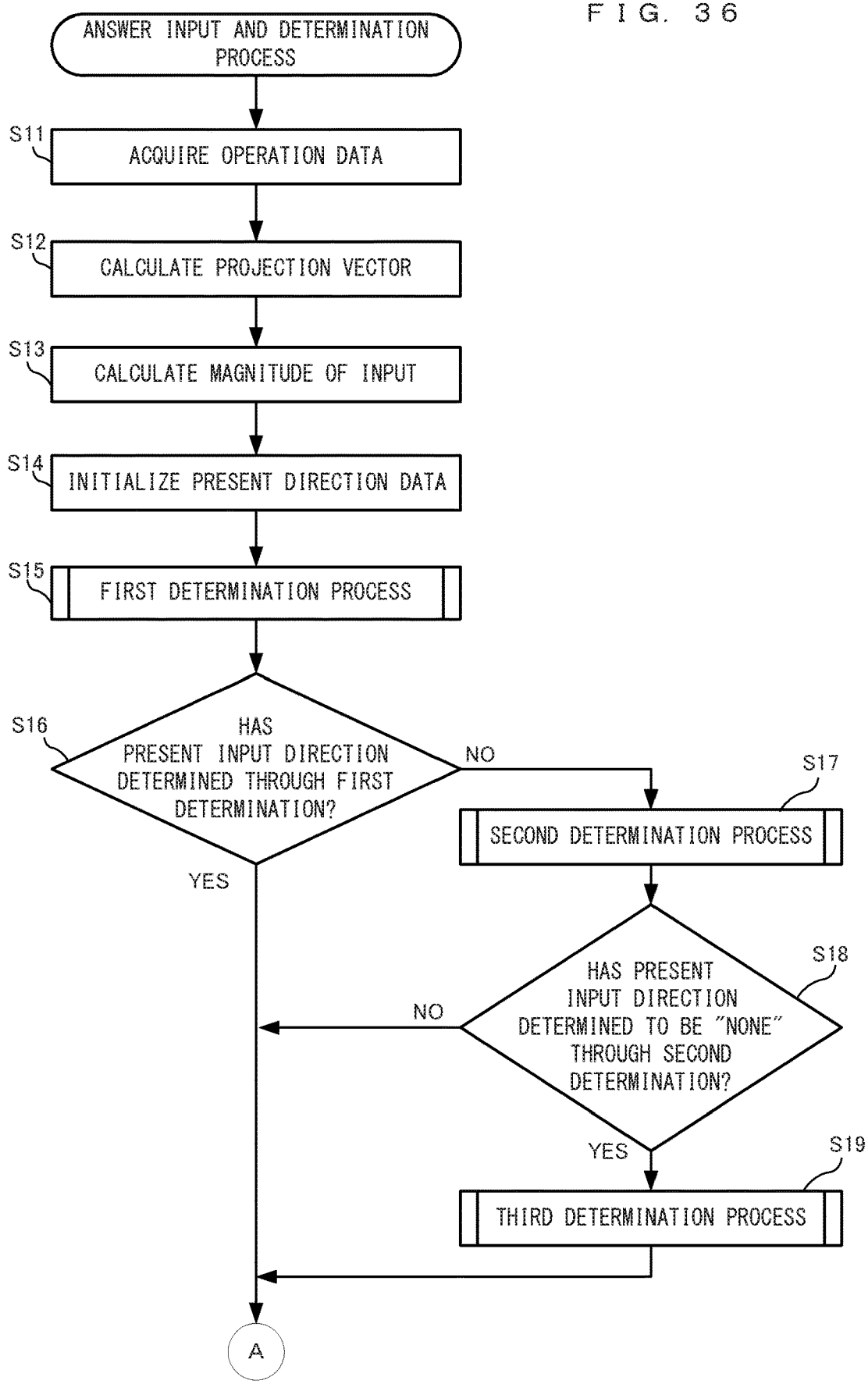
FIG. 36 is a flowchart showing the details of an answer input and determination process.
Figure 37:
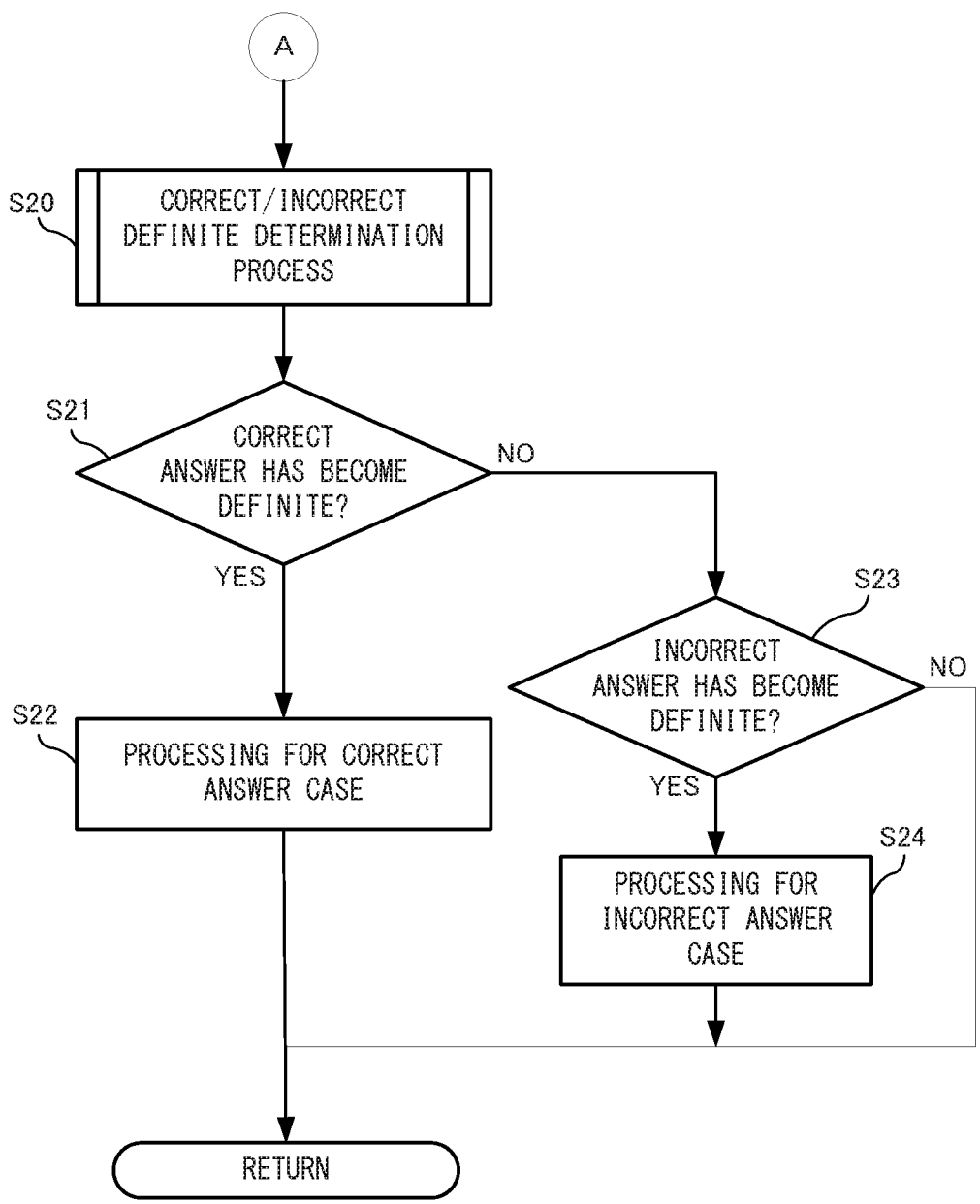
FIG. 37 is a flowchart showing the details of the answer input and determination process.

Next, in step S3, the processor 81 executes an answer input and determination process. FIG. 36 and FIG. 37 are flowcharts showing the details of the answer input and determination process. In FIG. 36, first, in step S11, the processor 81 acquires the operation data 402.

Next, in step S12, the processor 81 calculates the projection vector on the basis of the inertial sensor data 403. Specifically, the processor 81 calculates a three-dimensional vector indicating the orientation of the y-axis direction (see FIG. 5) of the controller on the basis of the inertial sensor data 403. Then, the processor 81 calculates a two-dimensional projection vector by projecting the three-dimensional vector on the above-described projection plane with the reference orientation set as an origin. Thus, the direction of the projection vector and the magnitude of the projection vector can be calculated.

Next, in step S13, the processor 81 calculates the magnitude of input described above with reference to FIG. 18. For example, the processor 81 determines whether the orientation of the controller is in a range of 0 to 1 or in a range of 1 to 2 as shown in FIG. 18. Then, if the orientation is in a range of 1 to 2, the processor 81 calculates a value obtained by "2−magnitude of projection vector", as the magnitude of input. On the other hand, if the orientation is in a range of 0 to 1, the processor 81 calculates the magnitude of the projection vector directly as the magnitude of input.

In this example, the following processing is performed using the calculated magnitude of input. However, in another exemplary embodiment, the magnitude of input may be reflected in the "magnitude of the projection vector", and then processing using the magnitude of the projection vector may be performed.

Next, in step S14, the processor 81 initializes the present direction data 415.

Figure 38:
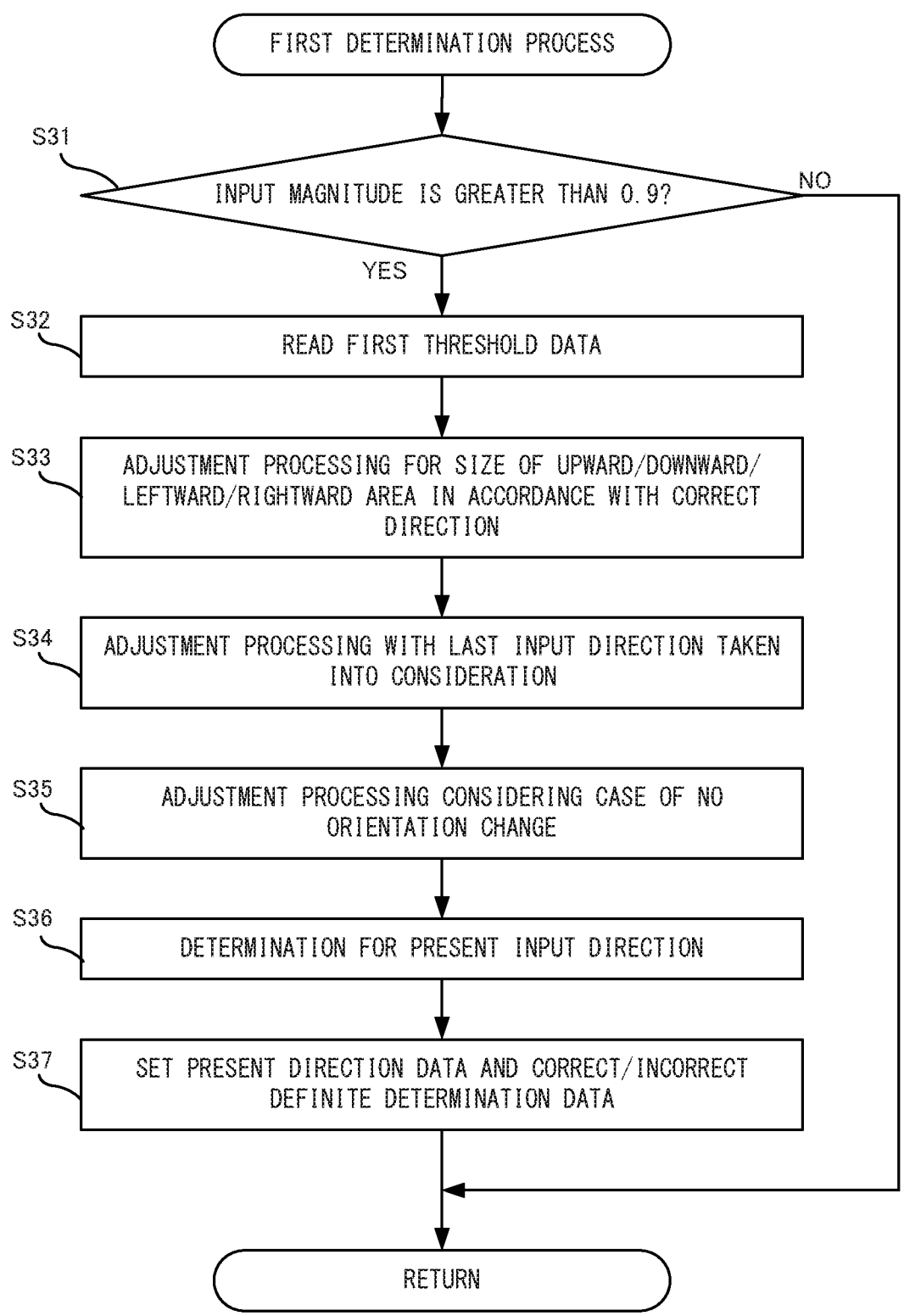
FIG. 38 is a flowchart showing the details of a first determination process.

Next, in step S15, the processor 81 executes a first determination process. FIG. 38 is a flowchart showing the details of the first determination process. First, in step S31, the processor 81 determines whether or not the calculated magnitude of input is greater than 0.9. As a result of the determination, if the calculated magnitude of input is not greater than 0.9 (NO in step S31), the processor 81 finishes the first determination process. That is, the first determination process is finished in a state in which the "present input direction" has not been determined.

On the other hand, if the magnitude of input is greater than 0.9 (YES in step S31), the processor 81 reads the first threshold data 409 in step S32.

Next, in step S33, the processor 81 acquires the correct direction information 4062 for the present question. Then, the processor 81 executes processing for adjusting the angle thresholds in accordance with the correct direction as described above with reference to FIG. 20 to FIG. 22.

Next, in step S34, the processor 81 executes angle threshold adjustment processing with the last input direction taken into consideration. That is, the processor 81 executes processing of further adjusting the angle thresholds for a predetermined direction on the basis of the last input direction data 416 and the correct direction at this time. In the case of the first question, the last input direction has not been determined (for example, the content of the last input direction data 416 is determined to be unspecified), and therefore the above processing is not performed.

Next, in step S35, the processor 81 executes adjustment processing for coping with a phenomenon in which, even though the orientation of the controller is not changed, the input direction is determined to be different between processing for the last frame and processing for the present frame, as described above. For example, the processor 81 performs determination as to the input direction, using the angle of the input direction indicated by the last input direction data 416 and the threshold adjusted through the processing until step S34 (threshold to be used at this time). Then, the processor 81 determines whether or not the determination result differs from the input direction in the processing for the last frame. That is, the processor 81 determines whether or not input determination occurs even though the controller is not moved. As a result, if performing determination as to the last input angle on the basis of the threshold used at this time leads to a determination result different from the last determination result, processing of further adjusting the angle threshold for the threshold that is used in the determination at this time is performed as described above. Also here, in the case of the first question, the last input direction data 416 does not exist yet, and therefore the above processing is not performed.

Next, in step S36, the processor 81 performs determination as to the present input direction, using the first threshold that has undergone the various adjustments described above, and the above calculated projection vector (direction thereof). Subsequently, in step S37, the processor 81 stores information indicating the determination result, into the present direction data 415. That is, the "present input direction" has been determined (here, determined to be "upward", "downward", "leftward", or "rightward"). Further, the processor 81 adds the same information as the present direction data 415, also to the correct/incorrect definite determination data 417. Thus, the first determination process is finished.

Returning to FIG. 36, next, in step S16, the processor 81 determines whether or not the "present input direction" has been determined through the first determination process, by referring to the present direction data 415. As a result, if the "present input direction" has been determined (YES in step S16), the process proceeds to step S20 described later.

Figure 39:
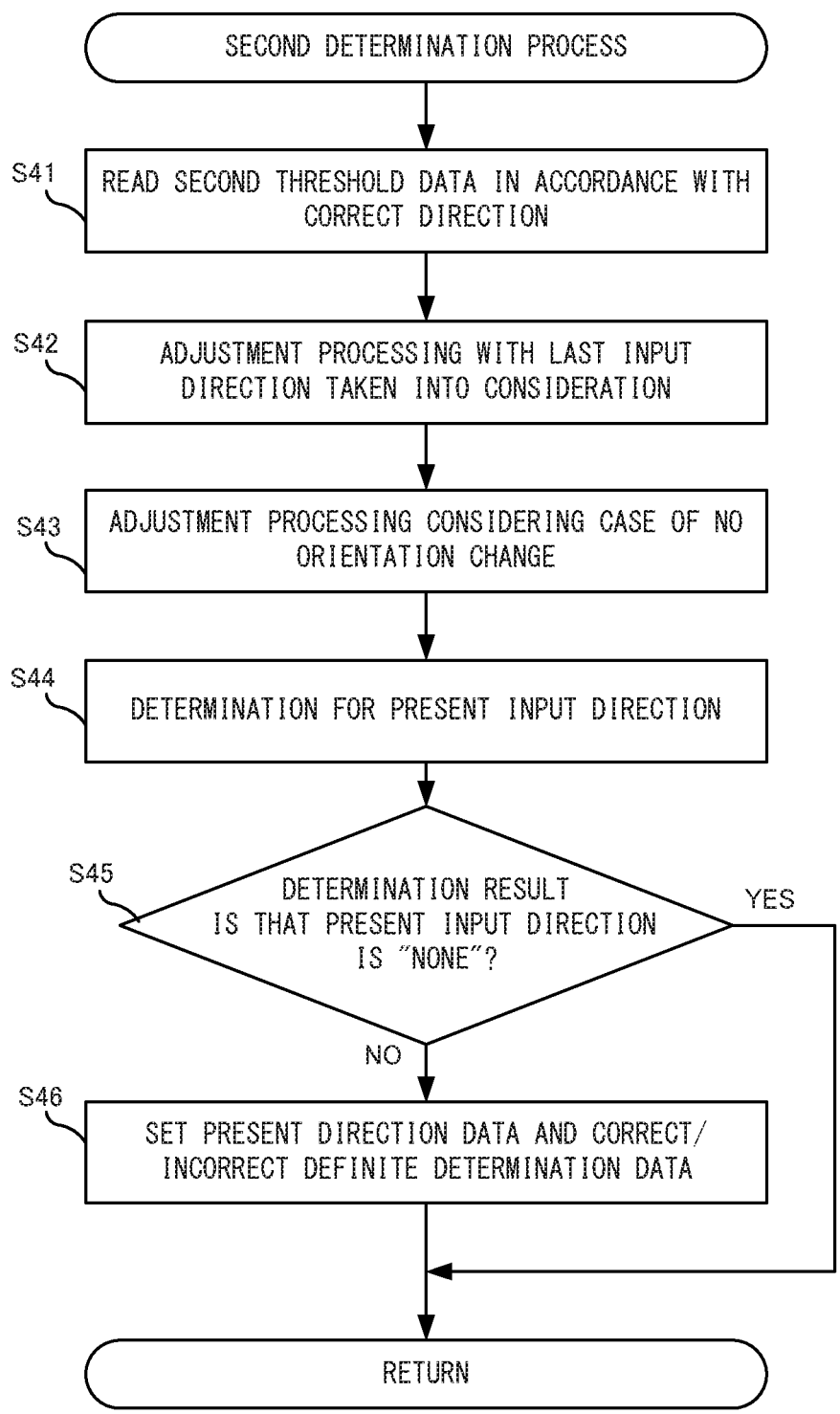
FIG. 39 is a flowchart showing the details of a second determination process.

On the other hand, if the "present input direction" has not been determined yet (NO in step S16), the processor 81 executes the second determination process in step S17. FIG. 39 is a flowchart showing the details of the second determination process. First, in step S41, the processor 81 acquires the correct direction information 4062 for the present question. Further, the processor 81 reads any one of the second upward direction threshold data 411, the second leftward/rightward direction threshold data 412, and the second downward direction threshold data 413, in accordance with the correct direction for the present question.

Next, in step S42, the processor 81 executes angle threshold adjustment processing with the last input direction taken into consideration. That is, the processor 81 executes processing of further adjusting the angle threshold for a predetermined direction on the basis of the last input direction data 416 and the correct direction for the present question. As in the above step S34, in the case of the first question, the above processing is not performed.

Next, in step S43, the processor 81 executes adjustment processing for coping with a phenomenon in which, even though the orientation of the controller is not changed, the input direction is determined to be different between processing for the last frame and processing for the present frame, as in the above step S35. Also here, as in the above step S35, the above processing is not performed in the case of the first question.

Next, in step S44, the processor 81 performs determination as to the present input direction, using the second threshold that has undergone the above various adjustments, and the direction of the projection vector and the magnitude of input calculated as described above. This determination result is "upward", "downward", "leftward", "rightward", or "none". Here, the case where the determination result is "none" is, for example, when the magnitude of input calculated in the above step S13 is smaller than the "magnitude of input" needed in the above adjusted second threshold.

Next, in step S45, whether or not the determination result is "none" is determined. As a result, if the determination result is not "none" (NO in step S45), the processor 81 stores information indicating the above determination result into the present direction data 415 in step S46. That is, the present input direction should be determined to be "upward", "downward", "leftward", or "rightward". Further, the processor 81 adds the same information as the present direction data 415, also to the correct/incorrect definite determination data 417. Thus, the second determination process is finished. On the other hand, if the determination result is "none" (YES in step S45), the second determination process is finished without performing the processing in the above step S46.

Returning to FIG. 36, next, in step S18, the processor 81 determines whether or not the present input direction has been determined to be "none" through the second determination process. That is, the processor 81 determines whether or not any one of "upward", "downward", "leftward", and "rightward" has been set in the present direction data 415. As a result of the determination, if the present input direction is not "none" (any one of "upward", "downward", "leftward", and "rightward" has been set) (NO in step S18), the process proceeds to step S20 described later. On the other hand, if the present input direction is "none" (YES in step S18), the processor 81 executes the third determination process in step S19.

Figure 40:
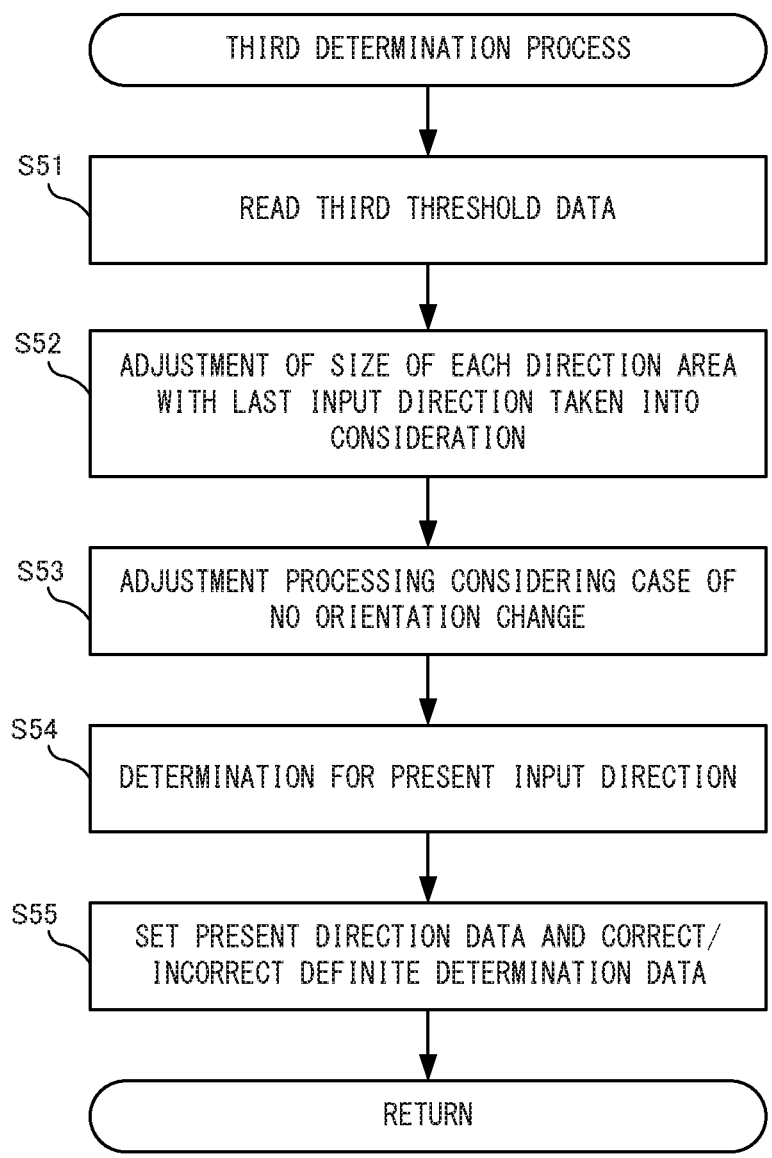
FIG. 40 is a flowchart showing the details of a third determination process.

FIG. 40 is a flowchart showing the details of the third determination process. First, in step S51, the processor 81 reads the third threshold data 414.

Next, in step S52, the processor 81 executes angle threshold adjustment processing with the last input direction taken into consideration. That is, the processor 81 executes processing of further adjusting the angle threshold for a predetermined direction on the basis of the last input direction data 416 and the correct direction information 4062 at this time. As in the above step S34, the above processing is not performed in the case of the first question.

Next, in step S53, the processor 81 executes adjustment processing for coping with a phenomenon in which, even though the orientation of the controller is not changed, the input direction is determined to be different between processing for the last frame and processing for the present frame, as described above. Also here, as in the above step S35, the above processing is not performed in the case of the first question.

Next, in step S54, the processor 81 performs determination as to the present input direction, using the third threshold that has undergone the above adjustment, and the direction of the projection vector and the magnitude of input calculated as described above. The determination result is "upward", "downward", "leftward", "rightward", or "none".

Next, in step S55, the processor 81 stores information indicating the determination result into the present direction data 415. Thus, the "present input direction" has been determined, including the case of "none". Further, the processor 81 adds the same information as the present direction data 415, also to the correct/incorrect definite determination data 417. Thus, the third determination process is finished.

Figure 41:
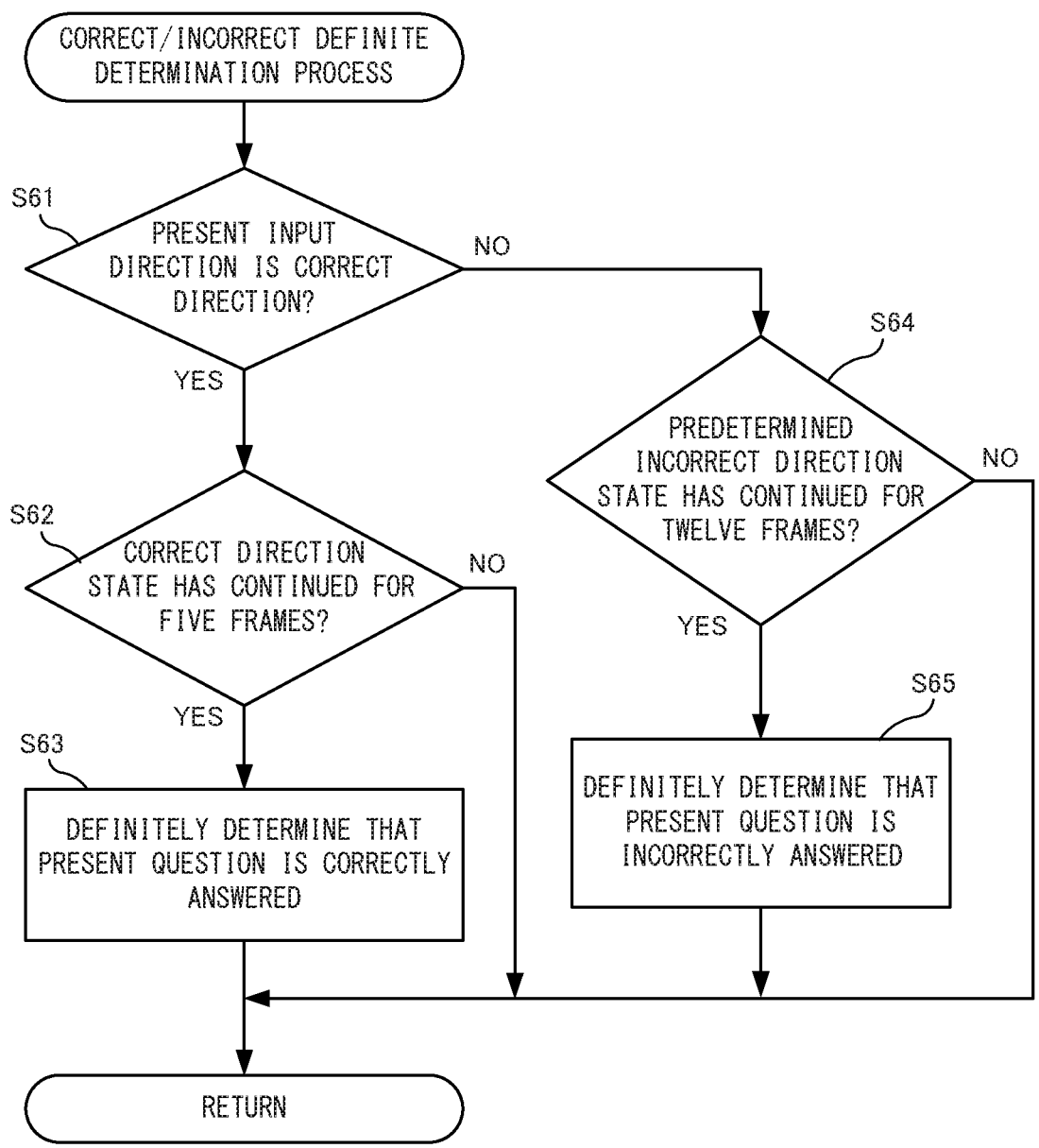
FIG. 41 is a flowchart showing the details of a correct/incorrect definite determination process.

Next, in step S20 in FIG. 37, the processor 81 executes a correct/incorrect definite determination process. This is a process for making a correct/incorrect answer definite by confirming whether or not the correct/incorrect state has continued for a predetermined number of frames. FIG. 41 is a flowchart showing the details of the correct/incorrect definite determination process. First, in step S61, the processor 81 determines whether or not the present input direction is the correct direction for the question at this time, by referring to the present direction data 415. As a result, if the present input direction is the correct direction (YES in step S61), next, in step S62, the processor 81 determines whether or not a state in which the orientation of the controller is in the correct direction has continued for five frames, by referring to the correct/incorrect definite determination data 417. As a result of the determination, if the correct direction state has continued for five frames (YES in step S62), the processor 81 executes processing for definitely determining that the answer for the question at this time is correct, in step S63. Specifically, the processor 81 sets information indicating that the present question is answered correctly, in the answer result data 418. Further, the processor 81 sets information indicating the input direction made definite here, in the last input direction data 416.

On the other hand, if the correct direction state has not continued for five frames (NO in step S62), the processing in the above step S63 is not performed and the correct/incorrect definite determination process is finished.

On the other hand, as a result of the determination in step S61, if the present input direction is not the correct direction (NO in step S61), next, in step S64, the processor 81 determines whether or not a state of not being the correct direction has continued for twelve frames. That is, the processor 81 determines whether or not a state in which the orientation of the controller is in a predetermined one direction other than the correct direction has continued for twelve frames. For example, if the correct direction is the upward direction, the processor 81 determines whether or not the rightward, leftward, or downward direction input has continued for twelve frames. That is, in the case where the present input direction is "none", such counting of the number of frames for making the incorrect answer definite is not performed.

As a result of the determination, if a state in which an input in a predetermined one direction that is an incorrect direction is being performed has continued for twelve frames (with the same orientation kept) (YES in step S64), the processor 81 executes processing for definitely determining that the answer for the question at this time is incorrect, in step S65. That is, the processor 81 sets information indicating that the answer for the present question is incorrect, in the answer result data 418. Further, the processor 81 sets information indicating the input direction made definite here, in the last input direction data 416.

On the other hand, as a result of the determination, if the above state has not continued for twelve frames (NO in step S64), the processing in the above step S65 is not performed and the correct/incorrect definite determination process is finished.

Returning to FIG. 37, next, in step S21, the processor 81 determines whether or not the answer for the present question has become definite as the correct answer through the correct/incorrect definite determination process. As a result, if the answer has become definite as the correct answer (YES in step S21), the processor 81 executes processing for correct answer case, in step S22. Specifically, the processor 81 performs various settings for displaying a representation for correct answer (e.g., representation of displaying a circle mark). Besides, the processor 81 performs processing for updating indication of the number of questions remaining, and the like.

On the other hand, if the answer for the present question is not definite as the correct answer (NO in step S21), the processor 81 determines whether or not the answer for the present question has become definite as an incorrect answer through the correct/incorrect definite determination process, in step S23. As a result, if the answer has become definite as an incorrect answer (YES in step S23), the processor 81 executes processing for incorrect answer case, in step S24. Specifically, the processor 81 performs various settings for displaying a representation for incorrect answer (e.g., representation of displaying an x mark). Besides, the processor 81 performs processing for updating indication of the number of questions remaining, and the like.

On the other hand, as a result of the determination in step S23, if neither a correct answer nor an incorrect answer has become definite for the present question (NO in step S23), the processing in the above step S24 is not performed and the answer input and determination process is finished.

Returning to FIG. 35, if the answer input and determination process is finished, the processor 81 generates and displays a screen in which the above processing result is reflected, in step S4. Thus, an operation of the player character 201 swinging the flag in accordance with the present input direction, representation of the correct/incorrect answer for each question, and the like are displayed.

Next, in step S5, the processor 81 determines whether or not the player has finished inputting answers. For example, in the case where the player is caused to answer all the questions, the processor 81 determines whether or not direction inputs that have become definite as correct or incorrect answers have been performed for times corresponding to the number of the questions, on the basis of the answer result data 418. Alternatively, the answering may be finished at the time when any of the questions is incorrectly answered. As a result of the determination, if the answer input has not been finished yet (NO in step S5), the process returns to step S3 to repeat the processing.

On the other hand, if the answer input has been finished (YES in step S5), in step S6, the processor 81 executes result display processing. The processor 81 performs score calculation and the like by referring to the answer result data 418, and generates and displays a result screen in the present stage. Thus, the game process (for one stage) is finished.

As described above, in the exemplary embodiment, in a game in which correct directions are presented to a player in advance and the player is caused to input the directions, the determination condition used for correct answer determination is adjusted in accordance with the correct direction so that each answer becomes more likely to be determined to be correct. Thus, the frequency of occurrence of erroneous determination can be decreased.

(Modifications)

In the above exemplary embodiment, a one-player game has been assumed as an example. However, for example, a two-player competitive game may be applied. For example, with one player using the right controller 4 and another player using the left controller 3, the two players may be caused to input answers simultaneously. Then, the one who has inputted more correct answers earlier may win the game.

Regarding the timings of question presentation and answer input, in the above example, correct directions for a set of questions for one stage are collectively presented in advance and the player is caused to input answers. However, the way of presentation of correct directions and answer input is not limited thereto. The above processing is also applicable to such a game that, like a music game, images of arrows indicating correct directions move from the upper side to the lower side of the screen and the player is caused to perform direction inputs in accordance with the timings at which the arrow images come to a predetermined position on the screen, for example. In this case, each of the moving arrow images corresponds to the "question" described above.

In the above determination (specifying) method for input directions, a projection vector obtained by projecting the orientation of the controller on a projection plane is used, as an example. Namely, the input directions are specified by confirming change in the orientation of the controller. However, in another exemplary embodiment, a method in which the movement direction of the controller is specified on the basis of the inertial sensor data 403 and the input direction is specified on the basis of the movement direction, may be used. That is, a direction input may be performed by moving the controller in parallel. Also in this case, the determination condition (e.g., various thresholds described above) used for input direction determination may be changed in accordance with each correct direction before the determination is performed.

For a direction input in answering, instead of an input using the inertial sensors as described above, an operation device such as a so-called analog stick or touch panel capable of analog input may be used. The above processing is applicable even in the case of using such an operation device capable of analog input. As a matter of course, the above processing is applicable even in the case of performing a direction input by means of button input using a direction key, a direction button, or the like.

Figure 42:
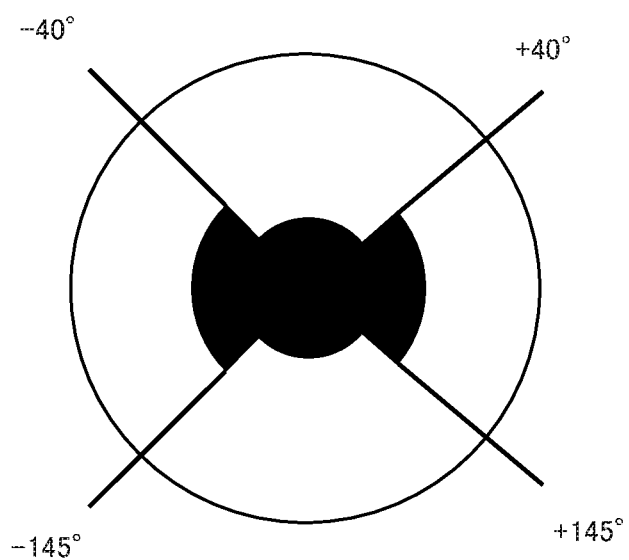
FIG. 42 shows another non-limiting example of a threshold for determination.

In the above exemplary embodiment, roughly three types of thresholds are used as the thresholds for input direction determination, and several examples of each type of threshold have been shown. However, as a matter of course, in another exemplary embodiment, thresholds other than the above examples may be used. For example, in the case where the upward direction or the downward direction is the correct direction, a threshold as shown in FIG. 42 may be used. In the example in FIG. 42, the magnitude of input needed for the upward area and the downward area is set to be smaller than the magnitude of input needed for the leftward area and the rightward area. That is, the distance from the origin is set to be shorter. Such setting is made considering that, when performing a direction input by swinging the controller, it might be more difficult to perform a direction input in the upward/downward direction than in the leftward/rightward direction (in particular, in the case of swinging the controller with a wrist as a fulcrum). By this setting, an input in the upward/downward direction becomes more likely to be detected, and thus, when the upward/downward direction is a correct direction, the input is more likely to be determined to be correct. Besides, depending on the game content, only the magnitude of input needed for the downward area may be reduced. Alternatively, the needed magnitude of input may be set to be smaller than that for the upward area. This is based on the standpoint that, when the controller is swung with a wrist as a fulcrum, an input in the downward direction is least recognizable among the upward, downward, leftward, and rightward directions (a wrist is least bendable in the downward direction).

Without limitation to the game system 1 as shown in the above exemplary embodiment, in another exemplary embodiment, an information processing apparatus such as a smartphone or a tablet terminal capable of a game process as described above may be used. As the controller, a controller communicable with such a smartphone or the like may be used.

While the exemplary embodiments have been described herein, it is to be understood that the above description is, in all aspects, merely an illustrative example, and is not intended to limit the scope thereof. It is to be understood that various modifications and variations can be made without deviating from the scope of the exemplary embodiments.

What is claimed is:

1. A computer-readable non-transitory storage medium having stored therein a game program for causing a computer of an information processing apparatus to execute a game process that causes a player to perform a direction input in a correct direction that is a correct answer for each of a plurality of questions, the game program causing the computer to:

perform question presentation processing of designating the correct direction for each question by display;
acquire operation data transmitted from an operation device;
specify an input direction on the basis of the operation data;
perform correct answer determination for whether the input direction is the designated correct direction or a direction other than the designated correct direction on the basis of a predetermined determination condition;
in performing the correct answer determination, change the determination condition in accordance with the correct direction so that the specified input direction becomes likely to be determined to be the correct answer; and
progress a game on the basis of a result of the correct answer determination.

2. The storage medium according to claim 1, wherein the operation device includes an inertial sensor, and the operation data includes data based on a detection result from the inertial sensor,
the game program causing the computer to:
calculate an orientation or a movement direction of the operation device on the basis of the operation data; and
specify the input direction on the basis of the orientation or the movement direction of the operation device.

3. The storage medium according to claim 2, the game program causing the computer to:
calculate a vector indicating a predetermined axis of the operation device, as the orientation;
set a determination area for a value of the vector;
perform the correct answer determination using, as the determination condition, whether or not the vector is included in a determination area corresponding to the correct answer; and
in performing the correct answer determination, change the determination condition so that the input direction becomes likely to be determined to be the correct answer, by enlarging the determination area corresponding to the correct answer, for each question.

4. The storage medium according to claim 3, wherein the vector is a projection vector obtained by projecting a three-dimensional vector indicating the predetermined axis of the operation device, on a two-dimensional plane such that a vector corresponding to a reference orientation is set as an origin,
the determination area is composed of areas divided in upward, downward, leftward, and rightward directions by lines passing through the origin with respect to the two-dimensional projection vector, the areas respectively including non-determination areas which are within a predetermined distance from the origin and in which an input is determined to be none of direction inputs, and direction determination areas located outside the non-determination areas and divided in the upward, downward, leftward, and rightward directions, the direction determination areas being for determining a direction input in each of the upward, downward, leftward, and rightward directions, and
in the correct answer determination, a central angle of the direction determination area corresponding to the correct answer is set to be great.

5. The storage medium according to claim 4, wherein the non-determination areas are set such that a distance from the origin for the downward area or the upward and downward areas is shorter than a distance from the origin for the leftward and rightward areas.

6. The storage medium according to claim 1, wherein the operation data includes data indicating the magnitude of input,
the program game causing the computer to:
when the magnitude of input is greater than a predetermined threshold, perform another determination processing of determining the input direction, before performing the correct answer determination; and
as a result of the other determination processing, if the input direction is the designated correct direction, progress the game in a manner corresponding to a case where the input direction is the correct answer, without performing the correct answer determination.

7. The storage medium according to claim 1, the game program causing the computer to, in the correct answer determination, make the determination definite when a state in which the input direction is determined to be any direction has continued for a predetermined time period, and change the determination condition such that, in a case where the input direction is determined to be the correct direction, the determination that the input direction is the correct direction becomes definite within a shorter continuation time period than in a case where the input direction is determined to be a direction other than the correct direction, so that the input direction becomes likely to be determined to be the correct answer.

8. A game system for executing a game process that causes a player to perform a direction input in a correct direction that is a correct answer for each of a plurality of questions, the game system comprising:
an operation device; and
a processor,
the processor being configured to:
perform question presentation processing of designating the correct direction for each question by display;
acquire operation data transmitted from an operation device;
specify an input direction on the basis of the operation data;
perform correct answer determination for whether the input direction is the designated correct direction or a direction other than the designated correct direction on the basis of a predetermined determination condition;
in performing the correct answer determination, change the determination condition in accordance with the correct direction so that the specified input direction becomes likely to be determined to be the correct answer; and
progress a game on the basis of a result of the correct answer determination.

9. The game system according to claim 8, wherein the operation device includes an inertial sensor, and the operation data includes data based on a detection result from the inertial sensor,
the processor being configured to:
calculate an orientation or a movement direction of the operation device on the basis of the operation data; and
specify the input direction on the basis of the orientation or the movement direction of the operation device.

10. The game system according to claim 9, the processor being configured to:

calculate a vector indicating a predetermined axis of the operation device, as the orientation;

set a determination area for a value of the vector;

perform the correct answer determination using, as the determination condition, whether or not the vector is included in a determination area corresponding to the correct answer; and in performing the correct answer determination, change the determination condition so that the input direction becomes likely to be determined to be the correct answer, by enlarging the determination area corresponding to the correct answer, for each question.

11. The game system according to claim 10, wherein the vector is a projection vector obtained by projecting a three-dimensional vector indicating the predetermined axis of the operation device, on a two-dimensional plane such that a vector corresponding to a reference orientation is set as an origin, the determination area is composed of areas divided in upward, downward, leftward, and rightward directions by lines passing through the origin with respect to the two-dimensional projection vector, the areas respectively including non-determination areas which are within a predetermined distance from the origin and in which an input is determined to be none of direction inputs, and direction determination areas located outside the non-determination areas and divided in the upward, downward, leftward, and rightward directions, the direction determination areas being for determining a direction input in each of the upward, downward, leftward, and rightward directions, and in performing the correct answer determination, a central angle of the direction determination area corresponding to the correct answer is set to be great.

12. The game system according to claim 11, wherein the non-determination areas are set such that a distance from the origin for the downward area or the upward and downward areas is shorter than a distance from the origin for the leftward and rightward areas.

13. The game system according to claim 8, wherein the operation data includes data indicating the magnitude of input, the processor being configured to:

when the magnitude of input is greater than a predetermined threshold, perform another determination processing of determining the input direction, before performing the correct answer determination; and as a result of the other determination processing, if the input direction is the designated correct direction, progress the game in a manner corresponding to a case where the input direction is the correct answer, without performing the correct answer determination.

14. The game system according to claim 8, the processor being configured to, in the correct answer determination, make the determination definite when a state in which the input direction is determined to be any direction has continued for a predetermined time period, and change the determination condition such that, in a case where the input direction is determined to be the correct direction, the determination that the input direction is the correct direction becomes definite within a shorter continuation time period than in a case where the input direction is determined to be a direction other than the correct direction, so that the input direction becomes likely to be determined to be the correct answer.

15. A game apparatus for executing a game process that causes a player to perform a direction input in a correct direction that is a correct answer for each of a plurality of questions, the game apparatus being configured to:

perform question presentation processing of designating the correct direction for each question by display;

acquire operation data transmitted from an operation device;

specify an input direction on the basis of the operation data;

perform correct answer determination for whether the input direction is the designated correct direction or a direction other than the designated correct direction on the basis of a predetermined determination condition;

in performing the correct answer determination, change the determination condition in accordance with the correct direction so that the specified input direction becomes likely to be determined to be the correct answer; and progress a game on the basis of a result of the correct answer determination.

16. The game apparatus according to claim 15, wherein the operation device includes an inertial sensor, and the operation data includes data based on a detection result from the inertial sensor, the game apparatus being configured to:

calculate an orientation or a movement direction of the operation device on the basis of the operation data; and specify the input direction on the basis of the orientation or the movement direction of the operation device.

17. The game apparatus according to claim 16, the game apparatus being configured to:

calculate a vector indicating a predetermined axis of the operation device, as the orientation;

set a determination area for a value of the vector;

perform the correct answer determination using, as the determination condition, whether or not the vector is included in a determination area corresponding to the correct answer; and in performing the correct answer determination, change the determination condition so that the input direction becomes likely to be determined to be the correct answer, by enlarging the determination area corresponding to the correct answer, for each question.

18. The game apparatus according to claim 15, the game apparatus being configured to, in the correct answer determination, make the determination definite when a state in which the input direction is determined to be any direction has continued for a predetermined time period, and change the determination condition such that, in a case where the input direction is determined to be the correct direction, the determination that the input direction is the correct direction becomes definite within a shorter continuation time period than in a case where the input direction is determined to be a direction other than the correct direction, so that the input direction becomes likely to be determined to be the correct answer.

19. A game processing control method for causing a computer to execute a game process that causes a player to perform a direction input in a correct direction that is a correct answer for each of a plurality of questions, the game processing control method causing the computer to:

perform question presentation processing of designating the correct direction for each question by display;

acquire operation data transmitted from an operation device;

specify an input direction on the basis of the operation data;

perform correct answer determination for whether the input direction is the designated correct direction or a direction other than the designated correct direction on the basis of a predetermined determination condition;

in performing the correct answer determination, change the determination condition in accordance with the correct direction so that the specified input direction becomes likely to be determined to be the correct answer; and progress a game on the basis of a result of the correct answer determination.

20. The game processing control method according to claim 19, wherein the operation device includes an inertial sensor, and the operation data includes data based on a detection result from the inertial sensor, the game processing control method causing the computer to:

calculate an orientation or a movement direction of the operation device on the basis of the operation data; and specify the input direction on the basis of the orientation or the movement direction of the operation device.

21. The game processing control method according to claim 20, the game processing control method causing the computer to:

calculate a vector indicating a predetermined axis of the operation device, as the orientation;

set a determination area for a value of the vector;

perform the correct answer determination using, as the determination condition, whether or not the vector is included in a determination area corresponding to the correct answer; and in performing the correct answer determination, change the determination condition so that the input direction becomes likely to be determined to be the correct answer, by enlarging the determination area corresponding to the correct answer, for each question.

22. The game processing control method according to claim 19, the game processing control method causing the computer to, in the correct answer determination, make the determination definite when a state in which the input direction is determined to be any direction has continued for a predetermined time period, and change the determination condition such that, in a case where the input direction is determined to be the correct direction, the determination that the input direction is the correct direction becomes definite within a shorter continuation time period than in a case where the input direction is determined to be a direction other than the correct direction, so that the input direction becomes likely to be determined to be the correct answer.

* * * * *